US009218287B2

(12) United States Patent
Miyazaki et al.

(10) Patent No.: US 9,218,287 B2
(45) Date of Patent: Dec. 22, 2015

(54) VIRTUAL COMPUTER SYSTEM, VIRTUAL COMPUTER CONTROL METHOD, VIRTUAL COMPUTER CONTROL PROGRAM, RECORDING MEDIUM, AND INTEGRATED CIRCUIT

(75) Inventors: Ryota Miyazaki, Osaka (JP); Masahiko Saito, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 133 days.

(21) Appl. No.: 13/819,466

(22) PCT Filed: Jan. 23, 2012

(86) PCT No.: PCT/JP2012/000379
§ 371 (c)(1),
(2), (4) Date: Feb. 27, 2013

(87) PCT Pub. No.: WO2012/102002
PCT Pub. Date: Aug. 2, 2012

(65) Prior Publication Data
US 2013/0166848 A1 Jun. 27, 2013

(30) Foreign Application Priority Data
Jan. 24, 2011 (JP) .................................. 2011-011649

(51) Int. Cl.
G06F 12/08 (2006.01)
G06F 9/46 (2006.01)

(52) U.S. Cl.
CPC ............ G06F 12/0804 (2013.01); G06F 9/468 (2013.01); G06F 2212/1052 (2013.01)

(58) Field of Classification Search
CPC ............ G06F 11/1451; G06F 11/2064; G06F 11/2082; G06F 12/00; G06F 12/12; G06F 12/08; G06F 12/122; G06F 12/02; G06F 12/10; G06F 12/0238; G06F 12/128; G06F 17/30215; G06F 17/30578; G06F 2201/84; G06F 9/45533; G06F 9/45558; G06F 2009/45583
See application file for complete search history.

(56) References Cited

U.S. PATENT DOCUMENTS 4,775,955 A 10/1988 Liu
5,906,000 A 5/1999 Abe et al.
8,347,380 B1 * 1/2013 Satish et al. .................... 726/22
(Continued)

FOREIGN PATENT DOCUMENTS

JP 62-105250 5/1987
JP 7-105091 4/1995
(Continued)

OTHER PUBLICATIONS

International Search Report issued Apr. 17, 2012 in International (PCT) Application No. PCT/JP2012/000379.

*Primary Examiner* — Jared Rutz
*Assistant Examiner* — Jean Edouard
(74) *Attorney, Agent, or Firm* — Wenderoth, Lind & Ponack, L.L.P.

(57) ABSTRACT

A virtual machine system comprises: a processor for executing a secure operating system and a normal operating system; and a cache memory. The cache memory stores data in a manner that allows for identification of whether the data has been read from a secure storage area of an external main memory. The cache memory writes back data to the main memory in a manner that reduces the number of times data is intermittently written back to the secure storage area which occurs when the processor is executing the normal operating system.

11 Claims, 22 Drawing Sheets

(56) References Cited

U.S. PATENT DOCUMENTS

| | | | |
|---|---|---|---|
| 2005/0131668 A1* | 6/2005 | Traut | 703/22 |
| 2005/0149933 A1 | 7/2005 | Saito et al. | |
| 2007/0260838 A1* | 11/2007 | Schwemmlein | 711/163 |
| 2009/0204785 A1* | 8/2009 | Yates et al. | 711/205 |
| 2010/0138744 A1* | 6/2010 | Kamay et al. | 715/716 |
| 2010/0185833 A1* | 7/2010 | Saito et al. | 712/203 |
| 2011/0208916 A1* | 8/2011 | Saito | 711/130 |

FOREIGN PATENT DOCUMENTS

| | | | |
|---|---|---|---|
| JP | 9-237225 | 9/1997 | |
| JP | 2000-242512 | 9/2000 | |
| JP | 2001-282560 | 10/2001 | |
| JP | 2004-145780 | 5/2004 | |
| JP | 2009-20555 | 1/2009 | |
| WO | 2009/075070 | 6/2009 | |
| WO | WO 2009075070 A1 * | 6/2009 | G06F 12/08 |

* cited by examiner

FIG. 13

| Sleep instruction type ~1300 | Power reduction level ~1310 | EV ~1320 |
|---|---|---|
| INST0 | 0 | 00 |
| INST1 | 1 | 01 |
| INST2 | 2 | 10 |
| INST3 | 3 | 11 |

VIRTUAL COMPUTER SYSTEM, VIRTUAL COMPUTER CONTROL METHOD, VIRTUAL COMPUTER CONTROL PROGRAM, RECORDING MEDIUM, AND INTEGRATED CIRCUIT

TECHNICAL FIELD

The present invention relates to a virtual machine system including a cache memory.

BACKGROUND ART

Conventionally, a virtual machine system is known that executes a plurality of operating systems (OS) on one physical machine.

For example, Patent Literatures 1 to 4 disclose technology related to a virtual machine system including a processor and a cache memory.

In a virtual machine system that handles confidential information, the confidential information is desirably protected against access (reading or writing) by a program other than a specific trusted program (hereinafter "secure program") for security reasons.

For this reason, some virtual machine systems include a Memory Protection Unit (MPU), a secure operating system (hereinafter "secure OS"), and a normal operating system (hereinafter "normal OS"). The MPU permits access to a specific storage area (hereinafter "secure storage area"), which is a part of a storage area of a main memory, only when the mode of a processor is in a specific privileged mode (hereinafter "secure mode"). The secure OS is a specific trusted operating system that exclusively controls execution of a secure program. The normal OS is an operating system that exclusively controls execution of a program other than the secure program. In such a virtual machine system, confidential information is stored in the secure storage area. Also, the secure OS is executed only when the processor is in the secure mode, and the normal OS is executed when the processor is in a lower privileged mode (hereinafter "normal privileged mode") than the secure mode. In this way, the confidential information is protected against programs other than the secure program.

CITATION LIST

Patent Literature

[Patent Literature 1]
 Japanese Patent Application Publication No. S62-105250
[Patent Literature 2]
 Japanese Patent Application Publication No. H07-105091
[Patent Literature 3]
 Japanese Patent Application Publication No. 2001-282560
[Patent Literature 4]
 WO No. 2009/075070
[Patent Literature 5]
 Japanese Patent Application Publication No. 2000-242512

SUMMARY OF INVENTION

Technical Problem

Suppose that a virtual machine system having the above structure includes a cache memory, and that given data read from the secure storage area is stored in the cache memory. In this case, along with the use of the cache memory while the processor in the normal privileged mode controls the execution of the normal OS, the need may arise to perform write-back processing in which the cache memory writes back the given data to the secure storage area (hereinafter also referred to as "write-back processing with respect to the secure storage area while execution of the normal OS is being controlled").

The following describes processing by the virtual machine system performed when the need arises to perform write-back processing with respect to the secure storage area while execution of the normal OS is being controlled.

Suppose that the cache memory attempts to perform write-back processing so as to write back data to the secure storage area while execution of the normal OS is being controlled. In this case, the MPU does not permit the write-back processing of the data since the processor is not operating in the secure mode. Instead, the MPU transmits a notification indicating the occurrence of exception to the processor. Upon receiving the notification, the processor performs the following processing in order to realize the write-back processing for the data to be written back to the secure storage area. That is, the processor (1) saves, into a predetermined context save area of the main memory, information indicating the state of the processor such as a register value of the processor, (2) changes the mode of the processor to the secure mode, and (3) restores a register value, etc. of the processor from information which indicates the state of the processor during the execution of the secure OS, and is saved in the predetermined context save area, and switches an OS to be executed from the normal OS to the secure OS. After the above processing, the MPU permits the write-back processing of the data with respect to the secure storage area, and the cache memory performs the write-back processing. Subsequently, the processor performs the following processing in order to resume the execution control of the normal OS in the normal privileged mode. That is, the processor (1) saves, into the predetermined context save area of the main memory, information indicating the state of the processor such as a register value of the processor, (2) changes the mode of the processor to the normal privileged mode, and (3) restores the register value, etc. of the processor from the information which indicates the state of the processor during the execution of the normal OS, and is saved in the predetermined context save area, and switches an OS to be executed from the secure OS to the normal OS.

When write-back processing with respect to the secure storage area occurs while the execution of the normal OS is being controlled as described above, the processor needs to perform a context switch at least twice. As a result, the processing time for the write-back processing with respect to the secure storage area becomes relatively long (e.g., several milliseconds) when the execution of the normal OS is controlled.

Accordingly, for a virtual machine system that requires a certain processing performance, it is desirable that the frequency of occurrence of write-back processing with respect to the secure storage area is reduced while the execution of the normal OS is being controlled.

The present invention has been achieved in view of the above problem, and an aim thereof is to provide a virtual machine system that is more likely to reduce the frequency of occurrence of write-back processing with respect to the secure storage area while the execution of the normal OS is being controlled, in comparison to conventional technology.

Solution to Problem

In order to solve the above problem, the present invention provides a virtual machine system including: a processor having a first mode and a second mode; a first operating system executed by the processor in the first mode; and a second operating system executed by the processor in the second mode, the virtual machine system comprising: a write control unit configured to permit writing of data into a predetermined secure storage area in an external main memory, only when the processor is in the first mode; and a cache memory having a plurality of ways for storing data read by the processor from the main memory, the cache memory including: a data storage unit configured to, when the processor has read data from the main memory, store the data into any of the plurality of ways that is ready to newly store data, in a manner that allows for identification of whether the data has been read from the secure storage area; and a write-back unit configured to identify whether data has been read from the secure storage area, and write back data stored in at least one of the ways to the main memory with use of a predetermined algorithm according to a result of the identification, the writing back being performed in a manner that reduces the number of times data stored in each of the ways is intermittently written back to the secure storage area, the writing back to the secure storage area occurring when the processor executing the second operating system accesses the main memory, and being for causing the at least one of the ways to be ready to newly store data.

Advantageous Effects of Invention

With the above structure, the virtual machine system of the present invention reduces the number of times write-back processing with respect to the secure storage area (i.e., secure area) is intermittently performed, while the processor in the second mode (normal privileged mode) is executing the second operating system (normal OS).

In this way, the virtual machine system is more likely to reduce the frequency of occurrence of write-back processing with respect to the secure storage area while the execution of the normal OS is being controlled, in comparison to conventional technology.

BRIEF DESCRIPTION OF DRAWINGS

FIG. 13 shows a correspondence table indicating the correspondence between sleep instruction types and pieces of power reduction level information (EV).

DESCRIPTION OF EMBODIMENTS

Embodiment 1

General Outline

As an embodiment of a virtual machine system according to the present invention, the following describes a virtual machine system that includes: a processor having a secure mode that is a privileged mode; a main memory including a secure storage area; an MPU that permits access to the secure storage area only when the processor is in the secure mode; and a cache memory, in a four-way set associative method, used by the processor.

In this virtual machine system, confidential data (e.g., encryption keys for decrypting digital contents, address book data including personal information, etc.) is stored in the secure storage area. A secure program has permission to access the confidential data, and the execution of the secure program is controlled only by a secure OS which is executed only when the processor is in the secure mode. The execution of an application program other than the secure program is controlled only by a normal OS which is executed when the processor is in a normal privileged mode. The normal privileged mode is a lower privileged mode than the secure mode.

The cache memory includes ways that are each constituted of lines. Each line stores data and an OS identifier for identifying an OS that was being executed by the processor when the data was read from the main memory. In a case where any of the lines specified by the same index needs to be written back to the main memory, the cache memory refers to the OS identifiers. If any of the OS identifiers indicates a normal OS in a sleep state and write-back processing with respect to the main memory is necessary, data read during the execution of the normal OS is prioritized over other data and is written back to the main memory prior to the other data.

The following describes the structure of a virtual machine system according to Embodiment 1, with reference to the drawings.

<Structure>

Figure 1:
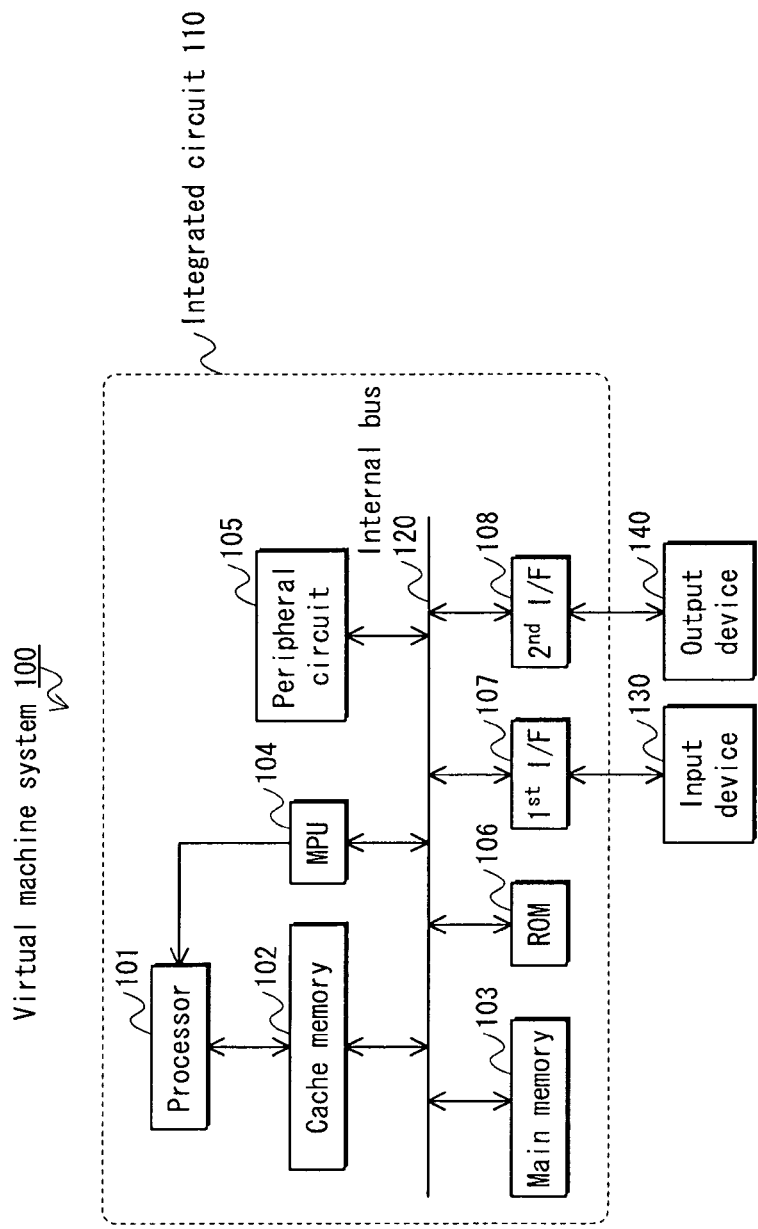
FIG. 1 is a block diagram showing the main hardware structure of a virtual machine system 100.

FIG. 1 is a block diagram showing the main hardware structure of a virtual machine system 100.

As shown in FIG. 1, the hardware of the virtual machine system 100 is a computer that includes an integrated circuit 110, an input device 130, and an output device 140.

The integrated circuit 110 includes a processor 101, a cache memory 102, a main memory 103, an MPU 104, a peripheral circuit 105, a ROM 106, a first interface 107, a second interface 108, and an internal bus 120.

The main memory 103 is connected to the internal bus 120, and stores programs that define the operations of the processor 101, along with data used by the processor 101. Part of a storage area of the main memory 103 is set as a secure storage area for storing confidential data.

The ROM 106 is connected to the internal bus 120, and stores programs that define the operations of the processor 101, along with data used by the processor 101.

The peripheral circuit 105 is connected to the internal bus 120 and controlled by the processor 101. The peripheral circuit 105 has a timer function, for example.

The first interface 107 and the second interface 108 are connected to the internal bus 120. The first interface 107 serves as an interface for the exchange of signals between the internal bus 120 and input device 130, and the second interface 108 serves as an interface for the exchange of signals between the internal bus 120 and the output device 140.

The input device 130 includes a keyboard, a mouse, etc., and is connected to the first interface 107. The input device 130 is controlled by the processor 101, receives an operation command from a user via the keyboard, the mouse, etc., and transmits the operation command to the processor 101.

The output device 140 includes a display, a speaker, etc., and is connected to the second interface 108. The output device 140 is controlled by the processor 101, and displays and outputs character strings, images, audio, and the like via the display, the speaker, etc.

The MPU 104 is connected to the internal bus 120 and the processor 101. The MPU 104 is controlled by the processor 101, and processes memory access requested by the processor 101. In particular, the MPU 104 operates in conjunction with the processor 101. When the processor 101 requests access to a secure storage area, and the operation mode of the processor 101 is set to a secure mode (described below), the MPU 104 grants the access request. When the operation mode of the processor 101 is set to either a normal privileged mode (described later) or a user mode (described later), the MPU 104 rejects the access request and issues an exception occurrence interrupt (hereinafter "secure-storage-area access exception interrupt") for the processor 101.

The processor 101 is connected to the cache memory 102 and the MPU 104. The processor 101 executes programs stored in either the main memory 103 or the ROM 106, thereby controlling the cache memory 102, the main memory 103, the MPU 104, the peripheral circuit 105, the ROM 106, the input device 130, and the output device 140 and causing the virtual machine system 100 to serve as a computer.

Also, during the execution of any of a load instruction, a store instruction, and an instruction fetch, the processor 101 outputs, to the cache memory 102, an OS identifier identifying an OS whose execution is currently under control. Furthermore, the processor 101 issues a sleep instruction and a wakeup instruction. The sleep instruction is to cause a specified OS to be placed in a sleep state so as to reduce the power consumption of the processor 101. The wakeup instruction is to cause an OS in a sleep state to be placed in a normal state.

Figure 2:
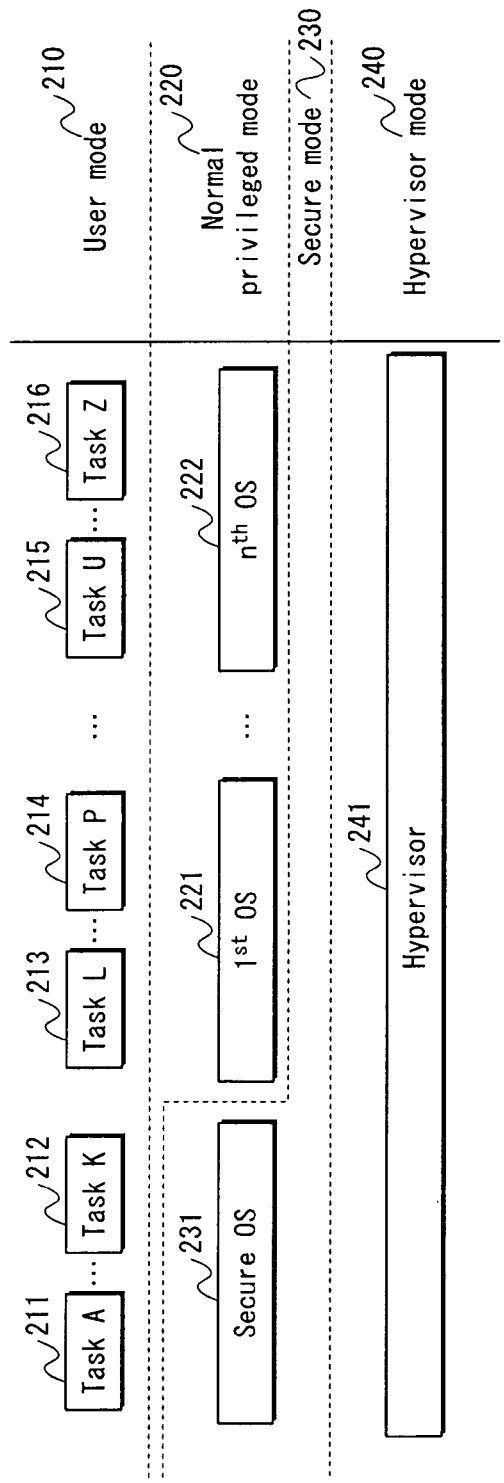
FIG. 2 schematically shows the operation modes of a processor 101.

FIG. 2 schematically shows the operation modes of the processor 101.

As shown in FIG. 2, the processor 101 has a user mode 210 for executing application programs (tasks A211 to Z216 in FIG. 2); a first privileged mode (hereinafter "normal privileged mode 220") for executing normal OSs (a first OS 221 to an $n^{th}$ OS 222); a second privileged mode (hereinafter "secure mode 230") that is a higher privileged mode than the normal privileged mode and is for executing a secure OS 231; and a third privileged mode (hereinafter "hypervisor mode 240") that is a higher privileged mode than the secure mode and is for executing a hypervisor 241 for controlling the execution of the OSs.

Here, the tasks A211 to K212 are secure programs having permission to access the confidential data stored in the secure storage area (described later) which is a part of the storage area of the main memory 103. The execution of the tasks A211 to K212 is controlled by the secure OS 231.

Among the tasks A211 to Z216, the tasks L213 to Z216 are normal programs not having permission to access the confidential data. The execution of the tasks L213 to Z216 is controlled by any of the first OS 221 to the $n^{th}$ OS 222. The tasks A211 to K212 are secure programs having permission to access confidential data. The execution of the tasks A211 to K212 is controlled by the secure OS 231.

The hypervisor 241 controls the execution of the OSs. Also, upon receiving the secure-storage-area access exception interrupt from the MPU 104 while the processor 101 is executing a normal OS, the hypervisor 241 (i) saves, into a predetermined context save area of the main memory 103, information indicating the state of the processor 101 such as a register value of the processor 101, (ii) changes the mode of the processor 101 to the secure mode, and (iii) restores a register value, etc. of the processor 101 from information which indicates the state of the processor 101 during the execution of the secure OS, and is saved in the predetermined context save area, and switches an OS to be executed from the normal OS to the secure OS.

Returning again to FIG. 1, description of the hardware structure of the virtual machine system 100 continues.

The cache memory 102 is a memory for sharing instructions and data in the four-way set associative method, and is connected to the internal bus 120 and the processor 101.

Figure 3:
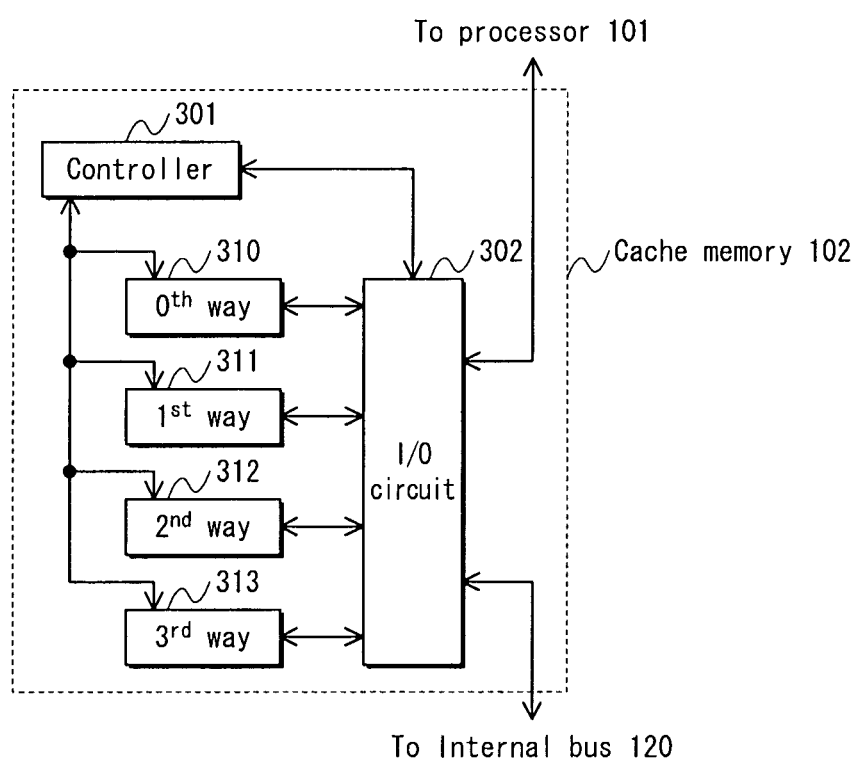
FIG. 3 is a block diagram showing the main hardware structure of a cache memory 102.

FIG. 3 is a block diagram showing the main hardware structure of the cache memory 102.

As shown in FIG. 3, the cache memory 102 includes a controller 301, an input/output circuit (I/O circuit) 302, a zeroth way 310, a first way 311, a second way 312, and a third way 313.

The controller 301 is connected to the I/O circuit 302, the zeroth way 310, the first way 311, the second way 312, and the third way 313. The controller 301 executes programs stored in an internal storage device thereof, thereby controlling the I/O circuit 302, the zeroth way 310, the first way 311, the second way 312, and the third way 313, and causing the cache memory 102 to serve as a cache memory in the four-way set associative method.

The zeroth way 310 to the third way 313 have similar functions and structures. Accordingly, the following description refers to the zeroth way 310 as a representative of these ways, unless otherwise specified.

The zeroth way 310 is connected to the controller 301 and the I/O circuit 302 and is controlled by the controller 301. The zeroth way 310 is a SRAM (Static Random Access Memory) including a plurality of line storage areas. Each of the line storage areas is specified by an index that is a part of a bit sequence of an address specifying a location in the storage area of the main memory 103. The zeroth way 310 stores bit sequences (hereinafter, simply "data") that are instructions or data used by the processor 101.

Figure 4A:
FIG. 4A shows the structure of an address.

FIG. 4A shows the structure of an address specifying a location in the storage area of the main memory 103.

As shown in FIG. 4A, an address specifying a location in the storage area of the main memory 103 is composed of a tag 401 and an index 402. The tag 401 is a bit sequence composed of more significant bits, and the index 402 is a bit sequence composed of less significant bits.

Figure 4B:
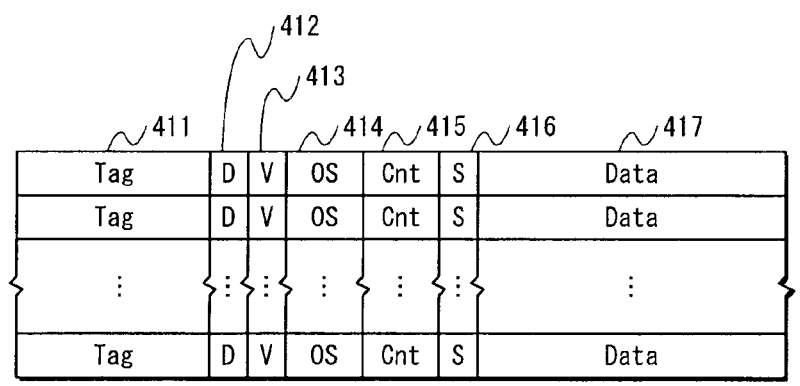
FIG. 4B is a block diagram showing the hardware structure of a zeroth way 310.

FIG. 4B is a block diagram showing the hardware structure of the zeroth way 310.

As shown in FIG. 4B, the zeroth way 310 is a SRAM including a plurality of line storage areas that are each specified by an index. The zeroth way 310 includes a tag storage area 411, a dirty bit storage area 412, a valid bit storage area 413, an OS identifier storage area 414, a counter storage area 415, a secure bit storage area 416, and a data storage area 417.

The data storage area 417 stores data used by the processor 101.

The tag storage area 411 stores a tag that is a part of an address, in the main memory 103, of data stored in the data storage area 417.

The dirty bit storage area 412 stores a dirty bit indicating whether coherency between data stored in the data storage area 417 and data stored in the main memory 103 is ensured. The dirty bit is set to "1" when coherency is not ensured between the data stored in the data storage area 417 and the data stored in the main memory 103, and is set to "0" when coherency is ensured therebetween.

The valid bit storage area 413 stores a valid bit indicating whether the data stored in the data storage area 417 is valid. The valid bit is set to "1" when the data stored in the data storage area 417 is valid, and is set to "0" when the data stored therein is invalid.

The OS identifier storage area 414 stores OS identification bits, which are bits constituting an OS identifier for identifying an OS that was being executed by the processor when the data in the data storage area 417 was read from the main memory 103.

The counter storage area 415 stores a two-bit counter value indicating, among the four line storage areas corresponding to the zeroth way 310 to the third way 313 and being specified by the same index, the order in which data was stored in the data storage area 417. The counter value is incremented by the controller 301. A larger counter value indicates that the corresponding data was stored less recently. For example, the counter value of "11" indicates that the data was stored least recently, and the counter value of "00" indicates that the data was stored most recently.

The secure bit storage area 416 stores a secure bit indicating whether the data stored in the data storage area 417 was stored in the secure storage area. The secure bit is set to "1" when the data stored in the data storage area 417 was stored in the secure storage area, and is set to "0" when the data was not stored in the secure storage area.

The I/O circuit 302 is connected to the controller 301, the zeroth way 310, the first way 311, the second way 312, the third way 313, the processor 101, and the internal bus 120, and is controlled by the controller 301. The I/O circuit 302 writes data into the zeroth way 310 to the third way 313, and reads data from the zeroth way 310 to the third way 313. Also, in the case where the I/O circuit 302 has attempted to read data from the zeroth way 310 to the third way 313 but the data is not stored in any of the zeroth way 310 to the third way 313, the I/O circuit 302 outputs a cache miss signal.

With the above structure, the cache memory 102 executes the programs stored in the internal storage device of the controller 301, and controls the I/O circuit 302, and the zeroth way 310 to the third way 313, thereby realizing (i) a data read function to read data upon receiving a tag and an index and (ii) a data storage function to store data upon receiving a tag, an index, data, and an OS identifier.

The following describes the data read function and the data storage function, with reference to the drawings.

Figure 5:
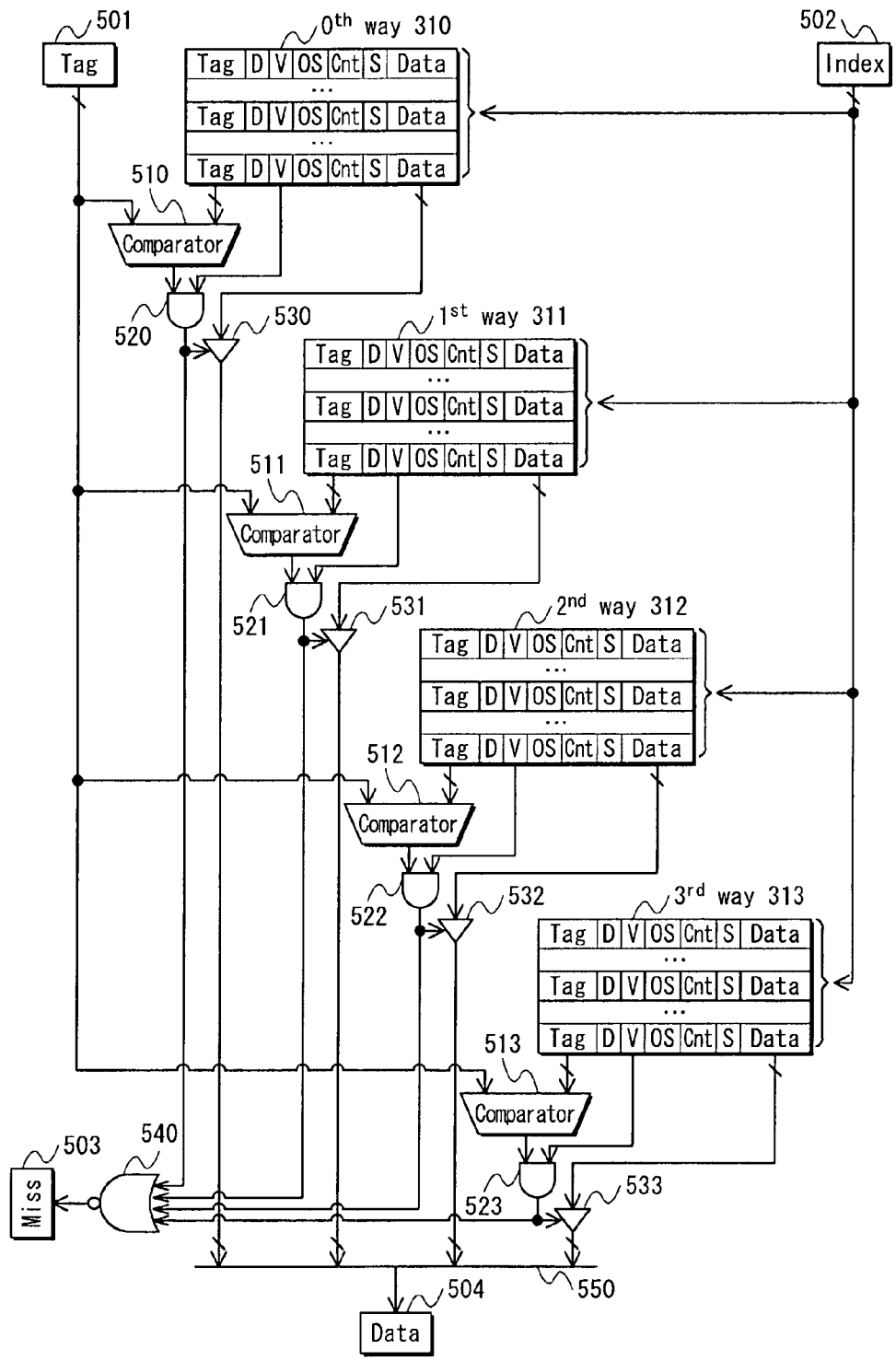
FIG. 5 is a functional block diagram showing a data read functional block.

FIG. 5 is a functional block diagram showing a data read functional block that realizes the data read function. The data read functional block is realized by the controller 301 executing the programs stored in the internal storage device and controlling the I/O circuit 302, and the zeroth way 310 to the third way 313.

As shown in FIG. 5, the data read functional block includes the zeroth way 310 to the third way 313, comparators 510 to 513, logical OR units 520 to 523, tri-state buffers 530 to 533, a logical NOR unit 540, a wired OR unit 550, a tag input unit 501, an index input unit 502, a cache miss signal output unit 503, and a data output unit 504.

The tag input unit 501 is connected to the processor 101 not shown in FIG. 5, and the comparators 510 to 513. Upon receiving a tag partially constituting an address from the processor 101, the tag input unit 501 transmits the tag to the comparators 510 to 513.

The index input unit 502 is connected to the processor 101 not shown in FIG. 5, and the zeroth way 310 to the third way 313. Upon receiving an index partially constituting an address from the processor 101, the index input unit 502 transmits a read signal and the index to the zeroth way 310 to the third way 313.

As described above, the zeroth way 310 is a SRAM including a plurality of line storage areas each specified by an index, and is connected to the index input unit 502, the comparator 510, the logical OR unit 520, and the tri-state buffer 530.

The comparators 510 to 513 have similar functions to each other. Accordingly, the following description refers to the comparator 510 as a representative of these comparators.

The comparator 510 is connected to the tag input unit 501, the zeroth way 310, and the logical OR unit 520. Upon receiving a tag from the tag input unit 501 and a tag from the zeroth way 310, the comparator 510 compares these tags. If the tags match, the comparator 510 outputs a signal having a logical value of "1". If the tags do not match, the comparator 510 outputs a signal having a logical value of "0".

The logical OR units 520 to 523 have similar functions to each other. Accordingly, the following description refers to the logical OR unit 520 as a representative of these logical OR units.

The logical OR unit 520 is connected to the comparator 510, the zeroth way 310, the tri-state buffer 530, and the logical NOR unit 540. The logical OR unit 520 outputs a logical OR signal composed of a signal transmitted from the comparator 510 and a valid bit output from the zeroth way 310.

The tri-state buffers 530 to 533 have similar functions to each other. Accordingly, the following description refers to the tri-state buffer 530 as a representative of these tri-state buffers.

The tri-state buffer 530 is connected to the zeroth way 310, the logical OR unit 520, and the wired OR unit 550. When the signal output from the logical OR unit 520 indicates a logical value of "0", the output of the tri-state buffer 530 is placed in a high impedance state. When a signal output from the logical OR unit 520 indicates a logical value of "1", the tri-state buffer 530 outputs data received from the zeroth way 310.

The logical NOR unit 540 is connected to the logical OR units 520 to 523 and the cache miss signal output unit 503. The logical NOR unit 540 generates a logical NOR signal from output signals of the logical OR units 520 to 523, and transmits the logical NOR signal as a cache miss signal.

The wired OR unit 550 is connected to the tri-state buffers 530 to 533 and the data output unit 504. The wired OR unit 550 generates a wired OR signal from output signals of the tri-state buffers 530 to 533, and outputs the wired OR signal as a data signal.

The cache miss signal output unit 503 is connected to the logical NOR unit 540, the processor 101 not shown in FIG. 5, and the MPU 104 not shown in FIG. 5. The cache miss signal output unit 503 outputs the cache miss signal received from the logical NOR unit 540 to the processor 101 and the MPU 104.

The data output unit 504 is connected to the wired OR unit 550 and the processor 101 not shown in FIG. 5. The data output unit 504 outputs a data signal output from the wired OR unit 550 to the processor 101.

Figure 6:
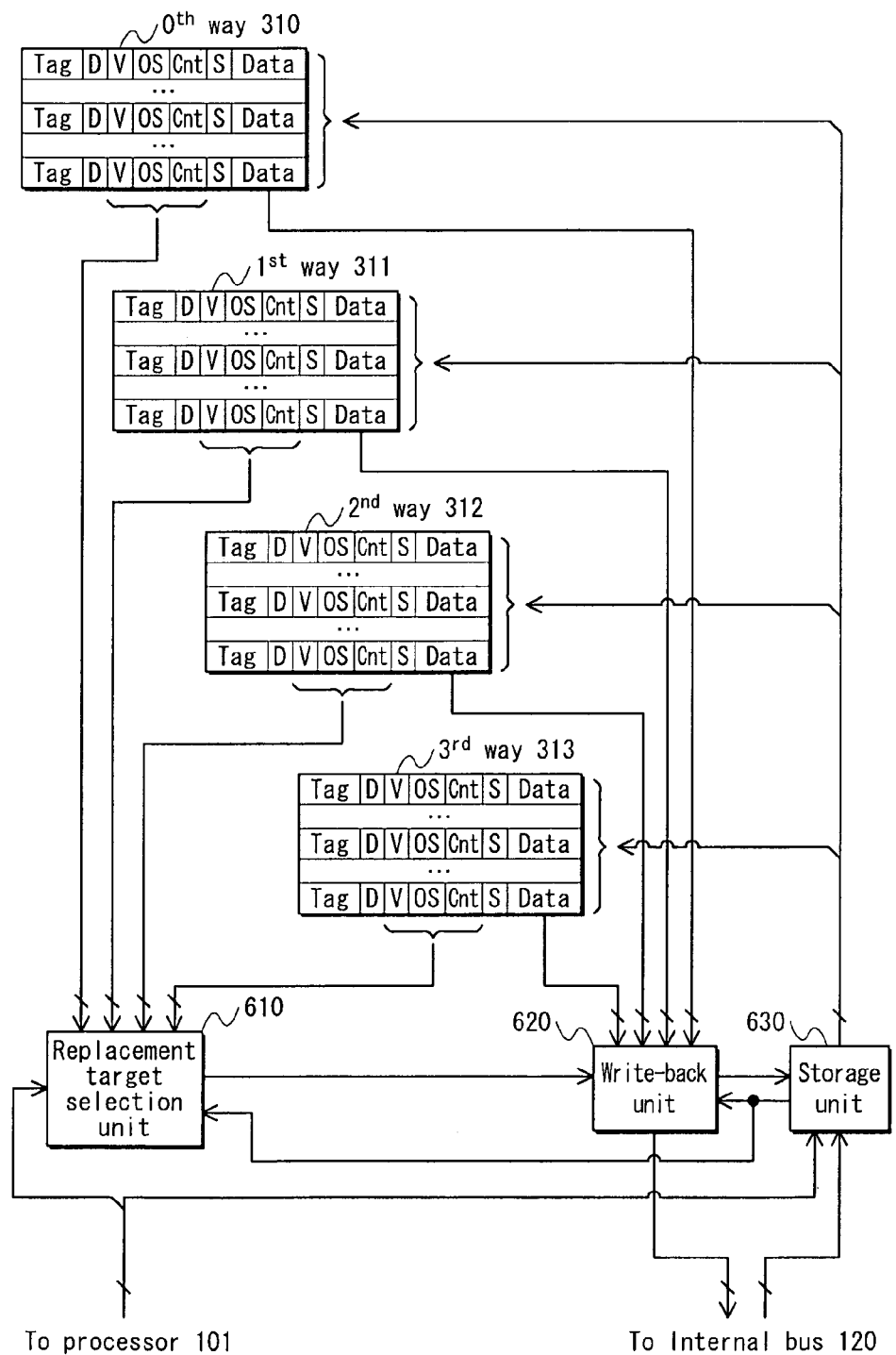
FIG. 6 is a functional block diagram showing a data storage function block.

FIG. 6 is a functional block diagram showing a data storage function block that realizes the aforementioned data storage function. The data storage function block is realized by the controller 301 executing the programs stored in the internal storage device and controlling the I/O circuit 302, and the zeroth way 310 to the third way 313.

As shown in FIG. 6, the data storage function block includes the zeroth way 310 to the third way 313, a replacement target selection unit 610, a write-back unit 620, and a storage unit 630.

The replacement target selection unit 610 is connected to the processor 101, the write-back unit 620, the storage unit 630, and the zeroth way 310 to the third way 313. When data needs to be stored in any of the four ways including the zeroth way 310 to the third way 313, the replacement target selection unit 610 selects a way for storing the data from among these four ways.

Figure 7:
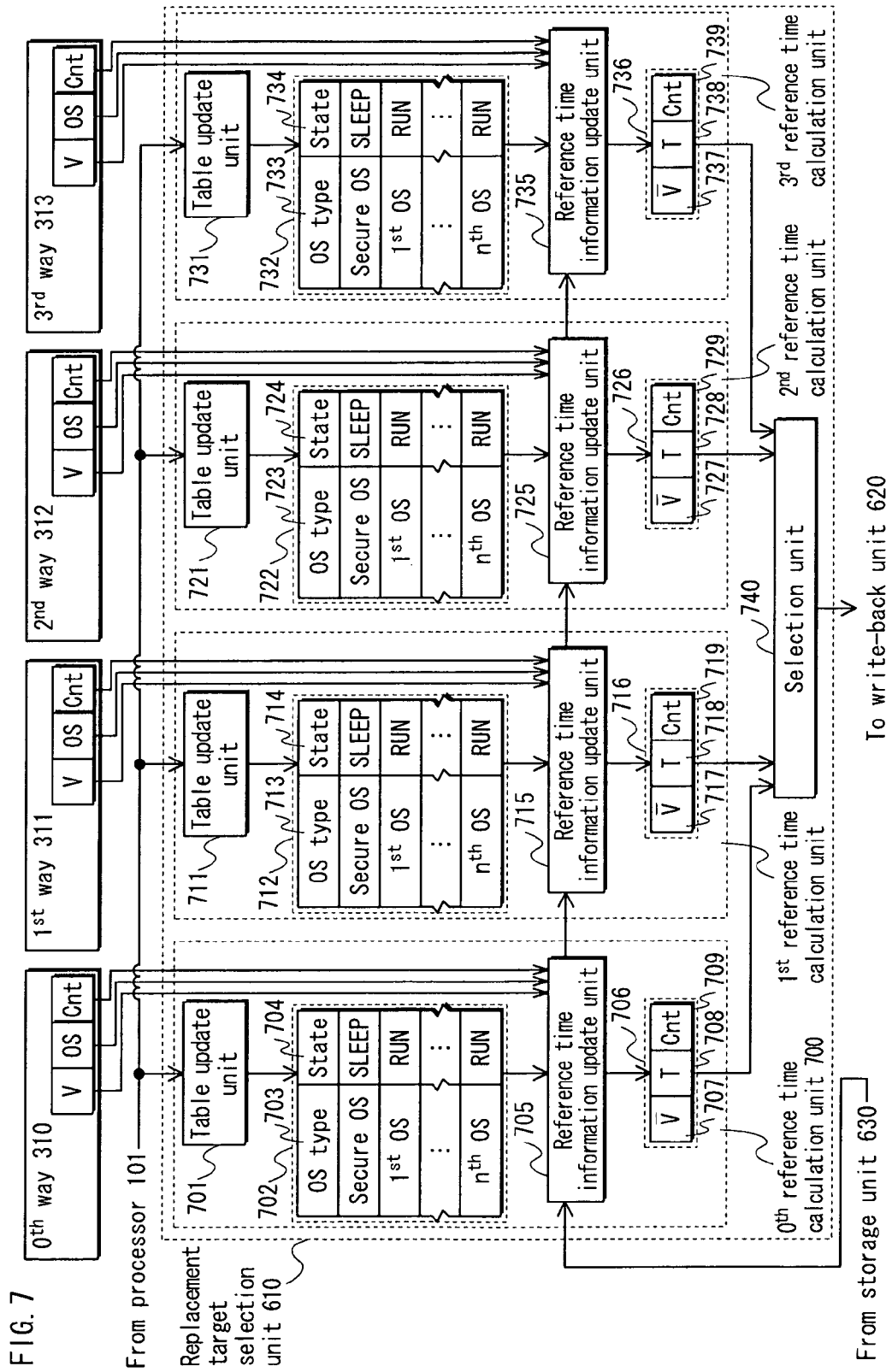
FIG. 7 is a functional block diagram showing the functional structure of a replacement target selection unit 610.

FIG. 7 is a functional block diagram showing the functional structure of the replacement target selection unit 610.

As shown in FIG. 7, the replacement target selection unit 610 includes a zeroth reference time calculation unit 700, a first reference time calculation unit 710, a second reference time calculation unit 720, a third reference time calculation unit 730, and a selection unit 740.

The zeroth reference time calculation unit 700 to the third reference time calculation unit 730 have similar functions to each other. Accordingly, the following description refers to the zeroth reference time calculation unit 700 as a representative of these reference time calculation units, unless otherwise specified.

The zeroth reference time calculation unit 700 is connected to the processor 101, the storage unit 630, the zeroth way 310, and the selection unit 740. The zeroth reference time calculation unit 700 refers to a valid bit, an OS identifier, and a counter value read from the zeroth way 310, and generates reference time information (described later).

As shown in FIG. 7, the zeroth reference time calculation unit 700 further includes a table update unit 701, a free level table storage unit 702, a reference time information update unit 705, and a reference time information holding unit 706.

The free level table storage unit 702 is connected to the table update unit 701 and the reference time information update unit 705, and stores a free level table.

The free level table indicates OS identifiers 703 in association with states 704.

The OS identifiers 703 are set in advance for respective OSs whose execution is to be controlled by the processor 101, and identify these OSs.

Each of the states 704 is information indicating the state of an OS identified by a corresponding OS identifier, and indicates either a sleep state or a run state. The sleep state indicates that the corresponding OS is activated by the processor 101 but is currently placed in a sleep state by a sleep instruction issued by the processor 101 in the past. The run state indicates that the corresponding OS is in a state other than the sleep state.

For example, according to the free level table of the free level table storage unit 702, the secure OS is in the sleep state, the first OS is in the run state, and the $n^{th}$ OS is in the run state.

The table update unit 701 is connected to the processor 101 and the free level table storage unit 702. The table update unit 701 detects a sleep instruction and a wakeup instruction issued from the processor 101, and updates the free level table of the free level table storage unit 702.

The reference time information update unit 705 is connected to the storage unit 630, the free level table storage unit 702, the zeroth way 310, and the reference time information holding unit 706, and has the following three functions.

Read function: Upon receiving an index from the storage unit 630, the reference time information update unit 705 reads a valid bit, an OS identifier, and a counter value stored in a line storage area of the zeroth way 310 specified by the index.

State bit generation function: Upon reading an OS identifier from the zeroth way 310, the reference time information update unit 705 refers to the free level table of the free level table storage unit 702, and generates a state bit which indicates a logical value of "1" when the OS identified by the read OS identifier is a normal OS and in the sleep state, and indicates a logical value of "0" in all other cases.

Reference time information update function: Upon reading a valid bit, an OS identifier, and a counter value and generating a state bit, the reference time information update unit 705 updates the reference time information (described later) of the reference time information update unit 705 with use of the valid bit and the counter value read from the zeroth way 310 and the generated state bit.

The reference time information holding unit 706 is connected to the reference time information update unit 705 and the selection unit 740, and stores the reference time information.

The reference time information is a 4-bit signal composed of: a 1-bit invalid bit which is an inverse signal of a valid bit read by the reference time information update unit 705 from the zeroth way 310; a 1-bit state bit generated by the reference time information update unit 705; and a 2-bit counter value read by the reference time information update unit 705 from the zeroth way 310.

The selection unit 740 is connected to the zeroth reference time calculation unit 700 to the third reference time calculation unit 730, and also to the write-back unit 620. The selection unit 740 compares (i) the reference time information corresponding to the zeroth way 310, which is stored in the reference time information holding unit 706 of the zeroth reference time calculation unit 700, (ii) the reference time information corresponding to the first way 311, which is stored in the reference time information holding unit 716 of the first reference time calculation unit 710, (iii) the reference time information corresponding to the second way 312, which is stored in the reference time information holding unit 726 of the second reference time calculation unit 720, and (iv) the reference time information corresponding to the third way 313, which is stored in the reference time information holding unit 736 of the third reference time calculation unit 730. Then, from among these four pieces of reference time information, the selection unit 740 selects a way corresponding to the reference time information indicating the largest value, and transmits a way selection signal specifying the selected way to the write-back unit 620. If multiple pieces of reference time information indicate the largest value, the selection unit 740 selects the way having the smallest way number from among the ways corresponding to the pieces of reference time information.

Figure 8:
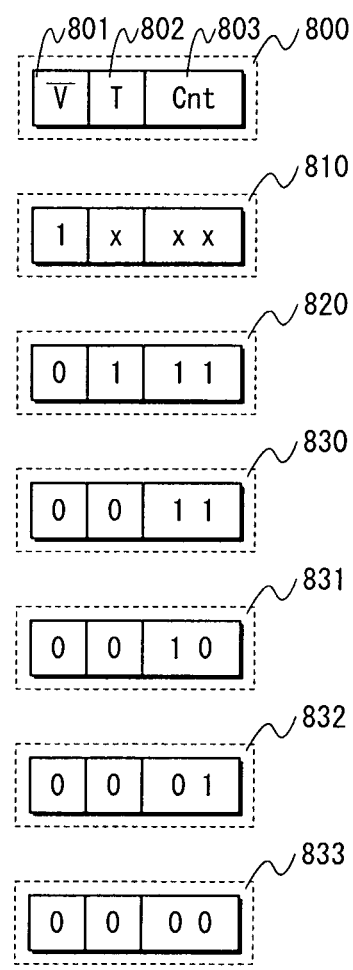
FIG. 8 schematically shows values that can be used in reference time information.

FIG. 8 schematically shows values that can be used in the reference time information.

As shown in FIG. 8, the reference time information is composed of a 1-bit invalid bit 801, a 1-bit state bit 802, and a 2-bit counter value 803, in order from the most significant bit.

Reference time information 810 is reference time information when the logical value of the invalid bit 801 is "1". Reference time information 820 is reference time information when the logical value of the invalid bit 801 is "0" and the logical value of the state bit 802 is "1". Reference time information 830 to reference time information 833 are each reference time information when the logical value of the invalid bit 801 is "0" and the logical value of the state bit 802 is "0".

As shown in FIG. 8, the reference time information in which the logical value of the invalid bit 801 is "1" takes a larger value than the reference time information in which the logical value of the invalid bit 801 is "0". In this way, in a case where some of the invalid bits 801 in the four pieces of reference time information targeted for selection indicate a logical value of "1", the selection unit 740 selects a way from among the ways corresponding to the pieces of reference time information whose invalid bits 801 indicate a logical value of "1". That is, when selecting a way, the selection unit 740 preferentially selects a way holding invalid data over a way holding valid data.

As for the pieces of reference time information whose invalid bits 801 indicate a logical value of "0", the reference time information whose state bit 802 indicates a logical value of "1" takes a larger value than the reference time information whose state bit 802 indicates a logical value of "0". In this way, in a case where some of the state bits 802 in the four pieces of reference time information targeted for selection indicate a logical value of "1", the selection unit 740 selects a way from among the ways corresponding to the pieces of reference time information whose state bits 802 indicate a logical value of "1". That is, when selecting a way under the condition where none of the ways holds invalid data, the selection unit 740 preferentially selects, from among the ways, a way storing data that was read from the main memory 103 while the execution of a normal OS currently in the sleep state was being controlled by the processor 101.

Note that in the selection of a way performed by the selection unit 740, priority is not particularly given to a way storing data that was read from the main memory 103 while the execution of the secure OS currently in the sleep state was being controlled by the processor 101.

Returning again to FIG. 6, description of the data storage function block continues.

The write-back unit 620 is connected to the internal bus 120, the replacement target selection unit 610, the storage unit 630, and the zeroth way 310 to the third way 313, and has the following three functions.

Write-back function: Upon receiving an index from the storage unit 630 and a way selection signal from the replacement target selection unit 610, if the logical value of a valid bit and the logical value of a dirty bit both indicate "1", the valid bit and the dirty bit being stored in the line storage area that is in the way specified by the way selection signal received from the replacement target selection unit 610 and that is specified by the index received from the storage unit 630, then the write-back unit 620 writes back the data stored in that line storage area to the main memory 103. Here, the write-back unit 620 writes back the data to the main memory 103 with use of the address composed of (i) the tag stored in the line storage area and (ii) the index that has been received.

Dirty bit update function: Upon completing write-back processing, the write-back unit 620 updates the logical value of the dirty bit stored in the line storage area targeted for the write-back processing to "0", and transmits, to the storage unit 630, the way selection signal received from the replacement target selection unit 610 and a dirty bit update signal indicating that the logical value of the dirty bit has been updated to "0".

Through function: Upon receiving an index from the storage unit 630 and a way selection signal from the replacement target selection unit 610, if at least one of the logical value of a valid bit or the logical value of a dirty bit indicates "0", the valid bit and the dirty bit being stored in the line storage area that is in the way specified by the received way selection signal and that is specified by the received index, the write-back unit 620 does not perform write-back processing, and transmits, to the storage unit 630, the way selection signal received from the replacement target selection unit 610 and a through signal indicating that at least one of the logical value of the valid bit or the logical value of the dirty bit is "0".

The storage unit 630 is connected to the processor 101, the internal bus 120, the replacement target selection unit 610, and the write-back unit 620, and has the following two functions.

Index transmission function: When the cache memory 102 is to newly store data used by the processor 101, and the storage unit 630 receives a tag, an index, and an OS identifier from the processor 101, and further receives the data to be stored from either the processor 101 or the main memory 103, the storage unit 630 transmits the received index to the replacement target selection unit 610 and the write-back unit 620.

Storage function: After index transmission processing, when either (i) the storage unit 630 has received a dirty bit update signal and a way selection signal from the write-back unit 620 or (ii) the storage unit 630 has received a through signal and a way selection signal from the write-back unit 620, the storage unit 630 (A) stores a tag received from the processor 101 and data received from either the processor 101 or the main memory 103 into a line storage area (hereinafter "specified line storage area") specified by the way selection signal received from the write-back unit 620 and an index received from the processor 101, (B) updates the dirty bit, the valid bit, the OS identifier, and the secure bit stored in the specified line storage area, and (C) updates the counter values stored in the respective line storage areas of the zeroth way 310 to the third way 313 specified by the index received from the processor 101. Here, the storage unit 630 updates the dirty bit such that the logical value thereof becomes "0", updates the valid bit such that the logical value thereof becomes "1", updates the OS identifier with use of an OS identifier received from the processor 101, updates the secure bit based on whether the address composed of the tag and index received from the processor 101 specifies a location in the secure storage area, and updates the counter values of the respective line storage areas such that a line storage area storing less recent data has a larger value.

The following describes an operation of the virtual machine system 100 having the above structure, with reference to the drawings.

<Operation>

The following describes storage processing which is a characteristic operation among operations by the virtual machine system 100.

<Storage Processing>

The storage processing is processing in which the cache memory 102 newly stores data used by the processor 101 into any of the zeroth way 310 to the third way 313.

Figure 9:
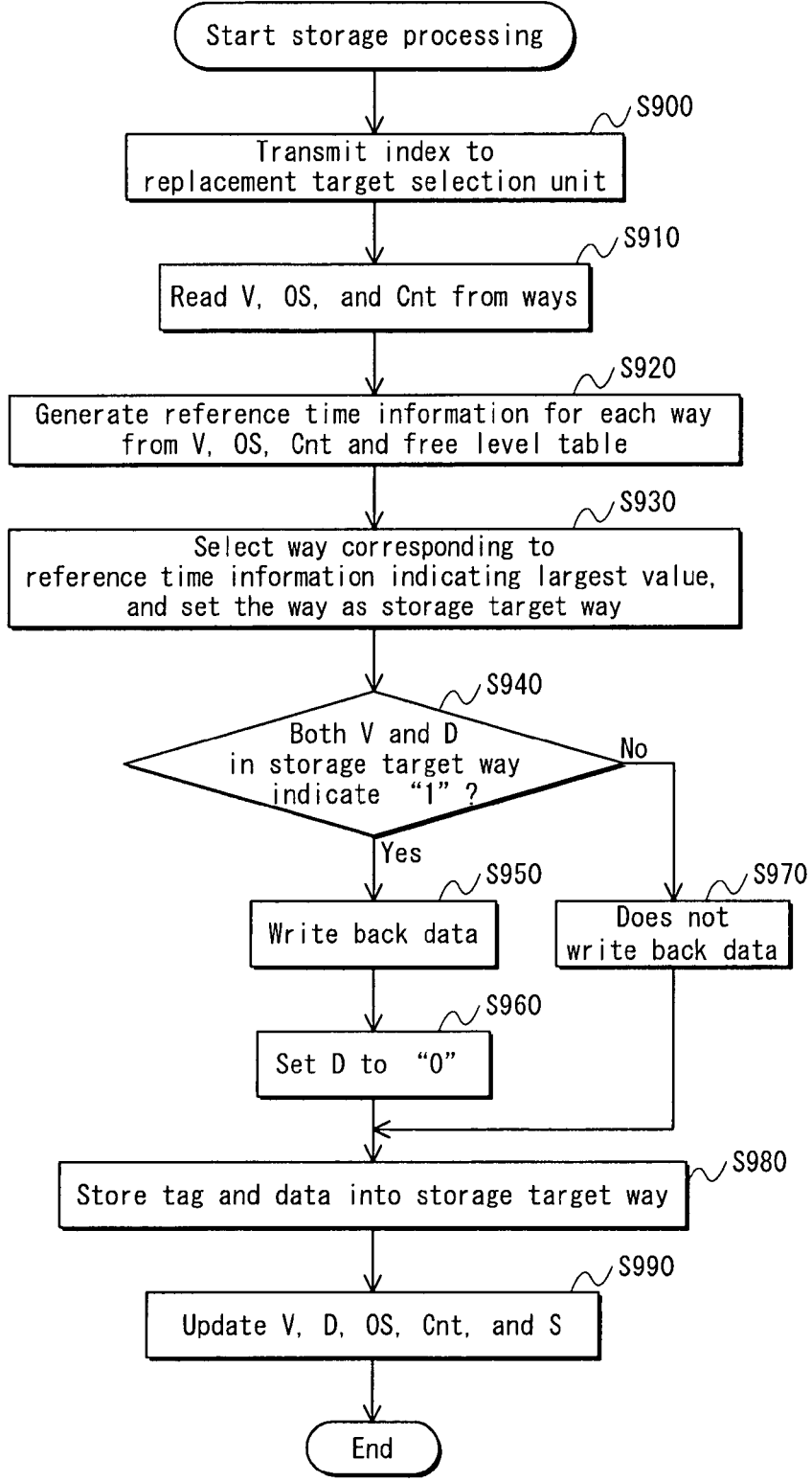
FIG. 9 is a flowchart showing storage processing.

FIG. 9 is a flowchart showing the storage processing.

The storage processing starts when the storage unit 630 receives a tag, an index, and an OS identifier from the processor 101, and further receives data to be stored from either the processor 101 or the main memory 103.

When the storage processing is started, the storage unit 630 transmits the index received from the processor 101 to the replacement target selection unit 610 and the write-back unit 620 (step S900).

Upon receiving the index from the storage unit 630, the replacement target selection unit 610 reads the valid bit, the OS identifier, and the counter value stored in each of the line storage areas of the zeroth way 310 to the third way 313 specified by the index (step S910).

The replacement target selection unit 610 updates, for each of the zeroth way 310 to the third way 313, the reference time information with use of the valid bit, the OS identifier, and the counter value, and the free level table stored therein (step S920).

Upon updating the reference time information for each of the zeroth way 310 to the third way 313, the replacement target selection unit 610 selects a way corresponding to a piece of reference time information indicating the largest values from among these pieces of reference time information, and transmits, to the write-back unit 620, a way selection signal specifying the way thus selected (step S930).

Upon receiving the way selection signal from the replacement target selection unit 610, the write-back unit 620 checks whether both the logical value of a valid bit and the logical value of a dirty bit both indicate "1", the valid bit and the dirty bit being stored in the line storage area that is in the way specified by the way selection signal received from the replacement target selection unit 610 and that is specified by the index received from the storage unit 630 (step S940).

In step S940, when the logical value of the valid bit and the logical value of the dirty bit both indicate "1" (step S940: Yes), the write-back unit 620 writes back the data stored in the line storage area to the main memory 103 (step S950), updates the logical value of the dirty bit stored in the line storage area (step S960), and transmits, to the storage unit 630, the way selection signal received from the replacement target selection unit 610 and a dirty bit update signal indicating that the logical value of the dirty bit has been updated to "0".

In step S940, when at least one of the logical value of the valid bit or the logical value of the dirty bit is "0" (step S940: No), the write-back unit 620 does not perform write-back processing, and transmits, to the storage unit 630, the way selection signal received from the replacement target selection unit 610 and a through signal indicating that at least one of the logical value of the valid bit or the logical value of the dirty bit is "0" (step S970).

Upon completing either step S960 or step S970, the storage unit 630 stores a tag received from the processor 101 and data received from either the processor 101 or the main memory 103 into the line storage area specified by the way selection signal received from the write-back unit 620 and the index received from the processor 101 (step S980). Furthermore, the storage unit 630 updates the dirty bit, the valid bit, the OS identifier, and the secure bit that are stored in the line storage area specified by the way selection signal received from the write-back unit 620 and the index received from the processor 101, and updates the counter values stored in the respective line storage areas of the zeroth way 310 to the third way 313 specified by the index received from the processor 101 (step S990).

When step S990 is completed, the cache memory 102 ends the storage processing.

<Discussion>

The following is generally known in a virtual machine system having a cache memory. That is, among pieces of data stored in the cache memory, data read from a main memory while execution of a normal OS currently in a sleep state was being controlled by a processor is less likely to be used by the processor for a while (while the normal OS is in the sleep state).

Regarding the virtual machine system 100 having the structure described above, when the cache memory 102 newly stores data used by the processor 101, and data in the cache memory 102 needs to be written back to the main memory 103, the virtual machine system 100 preferentially selects, from among the ways, a way storing data that was read from the main memory 103 while the execution of a normal OS currently in the sleep state was being controlled by the processor 101, and writes back the data stored in the selected way to the main memory 103.

In this way, when any of the normal OSs is in the sleep state, the virtual machine system 100 can relatively effectively use the cache memory 102.

Meanwhile, data read from the main memory 103 while the execution of the secure OS was being controlled may be data read from the secure storage area.

Suppose here that the secure OS is in the sleep state, namely that the execution of a normal OS is controlled by the processor 101. In this case, if an attempt is made to write back data read from the secure storage area, the operation mode of the processor 101 needs to be switched to the secure mode. As a result, an OS to be executed needs to be switched from the normal OS to the secure OS. This switch processing takes a relatively long time.

Regarding the virtual machine system 100 having the structure described above, when the secure OS is in the sleep state and data in the cache memory 102 needs to be written back to the main memory 103, priority in terms of selection of a way from which data is to be written back is not given to a way storing data that was read from the main memory 103 while the execution of the secure OS currently in the sleep state was being controlled by the processor 101.

In this way, compared to a conventional virtual machine system that equally handles a normal OS in a sleep state and a secure OS in a sleep state, the virtual machine system 100 is more likely to reduce the frequency of occurrence of write-back processing with respect to the secure storage area while the execution of a normal OS is being controlled.

In general, data read from the main memory while the execution of the secure OS was being controlled by the processor is not necessarily data read from the secure storage area. However, the virtual machine system 100 may have a structure where all data handled by the secure OS whose execution is controlled by the processor 101 is stored in the secure storage area. In such a case, when an OS identifier stored in a line storage area indicates the secure OS, it means that the data stored in the line storage area is data read from the secure storage area.

Embodiment 2

General Outline

As an embodiment of a virtual machine system according to the present invention, the following describes a first modified virtual machine system that is a partial modification to the virtual machine system 100 of Embodiment 1.

The first modified virtual machine system according to Embodiment 2 has the same hardware structure as the virtual machine system 100 according to Embodiment 1, but differs therefrom with respect to some of the programs stored in the internal storage device of the controller 301.

Regarding the virtual machine system 100 according to Embodiment 1, when the cache memory 102 newly stores data used by the processor 101, and data in the cache memory 102 needs to be written back to the main memory 103, the virtual machine system 100 preferentially selects, from among the ways, a way storing data that was read from the main memory 103 while the execution of a normal OS currently in the sleep state was being controlled by the processor 101, and writes back the data stored in the selected way to the main memory 103. On the other hand, in the first modified virtual machine system according to Embodiment 2, when the processor 101 has issued a sleep instruction for causing the secure OS to be placed in the sleep state, the cache memory 102 collectively frees all line storage areas each storing a secure bit having a logical value of "1". Here, "freeing a line storage area" refers to an operation of setting the logical value of the valid bit of a line storage area to "0", in a state where coherency is ensured between the data stored in the line storage area and the main memory 103.

The following describes the first modified virtual machine system according to Embodiment 2, with reference to the drawings and with particular attention to differences from the virtual machine system 100 according to Embodiment 1.
<Structure>

The first modified virtual machine system has the same hardware structure as the virtual machine system 100 according to the Embodiment 1. Accordingly, explanations thereof are omitted.

Regarding the first modified virtual machine system, some of the programs stored in the internal storage device of the controller 301 are modified from those in the virtual machine system 100 according to Embodiment 1. As a result, the data storage function realized by the cache memory 102 in the virtual machine system 100 according to Embodiment 1 is modified to a first modified data storage function.

The following describes the first modified data storage function, with reference to the drawings.

Figure 10:
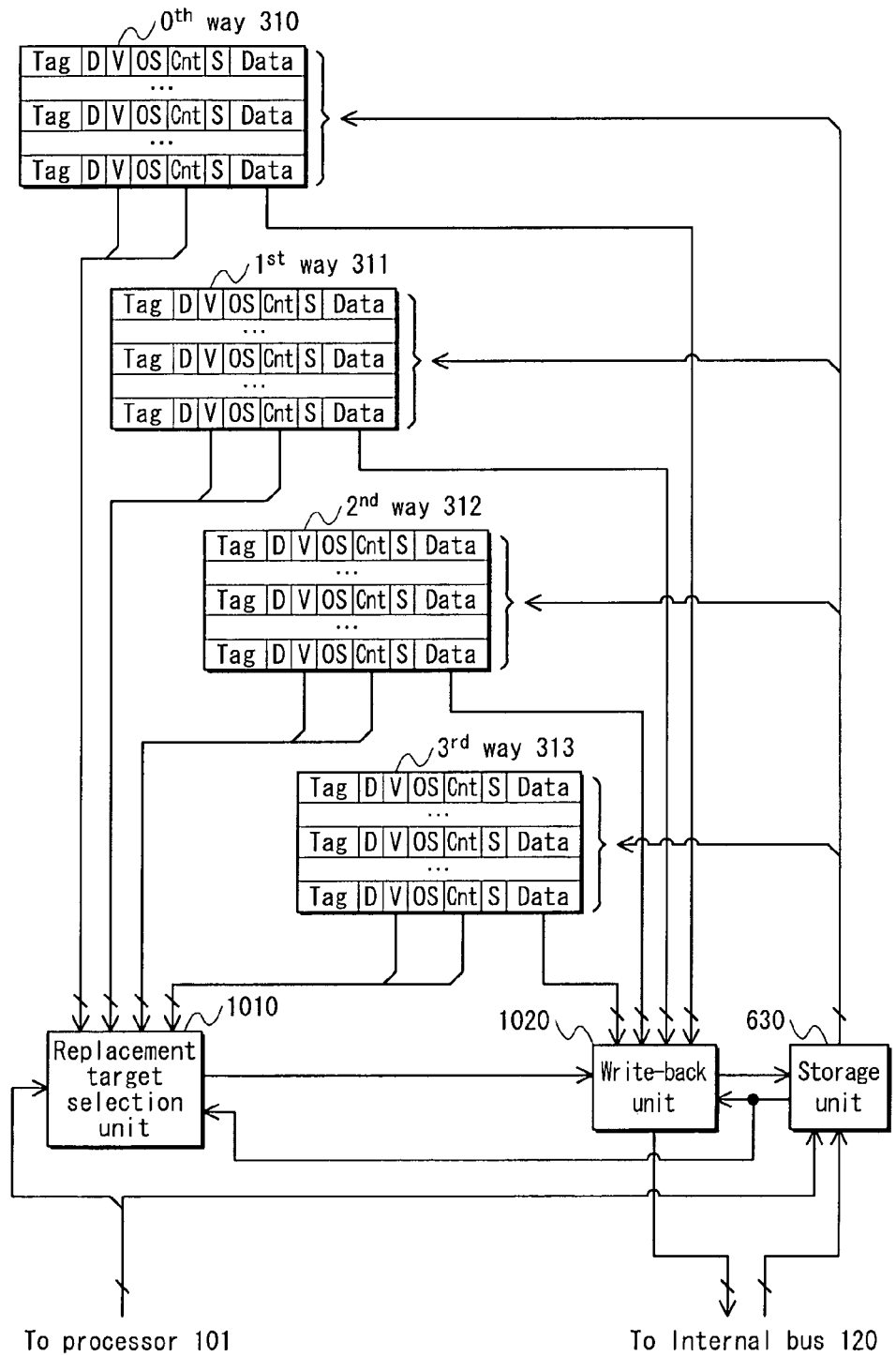
FIG. 10 is a functional block diagram showing a first modified data storage function block.

FIG. 10 is a functional block diagram showing a first modified data storage function block that realizes the first modified data storage function. The first modified data storage function block is realized by the controller 301 executing the programs stored in the internal storage device and controlling the I/O circuit 302, and the zeroth way 310 to the third way 313.

As shown in FIG. 10, the first modified data storage function block differs from the data storage function block according to Embodiment 1, with respect to (i) a replacement target selection unit 1010 which is a modification of the replacement target selection unit 610 and (ii) a write-back unit 1020 which is a modification of the write-back unit 620.

The replacement target selection unit 1010 is connected to the processor 101, the write-back unit 1020, the storage unit 630, and the zeroth way 310 to the third way 313, and has the following two functions.

First modified read function: Upon receiving an index from the storage unit 630, the replacement target selection unit 1010 performs read processing for reading a valid bit and a counter value stored in each of the line storage areas of the zeroth way 310 to the third way 313 specified by the index thus received.

Way selection function: After read processing, the replacement target selection unit 1010 (i) generates, for each of the four ways, a 3-bit selection bit sequence composed of a 1-bit invalid bit and a 2-bit counter value that has been read, the 1-bit invalid bit being an inverse signal of a valid bit that has been read and being the most significant bit, and the 2-bit counter value being the less significant bits, (ii) selects, from among the four selection bit sequences thus generated, a way corresponding to the selection bit sequence having the largest value, and (iii) transmits a way selection signal specifying the selected way to the write-back unit 1020. If multiple selection bit sequences indicate the largest value, the replacement target selection unit 1010 selects the way having the smallest way number.

The write-back unit 1020 is connected to the processor 101, the internal bus 120, the replacement target selection unit 1010, the storage unit 630, and the zeroth way 310 to the third way 313, and has the following two functions in addition to the write-back function, dirty bit update function, and through function of the write-back unit 620 according to Embodiment 1.

Secure bit search function: When the processor 101 issues a sleep instruction for causing the secure OS to be placed in the sleep state, the write-back unit 1020 detects the sleep instruction, and performs secure bit search processing, thereby checking whether any of the line storage areas in the zeroth way 310 to the third way 313 stores a secure bit having a logical value of "1". If one or more line storage areas each storing a secure bit having a logical value of "1" exist, the write-back unit 1020 acquires, for each of the one or more line storage areas, a way number and an index that specify the line storage area.

Secure data write-back function: After secure bit search processing, if having acquired one or more pairs of a way number and an index each specifying a line storage area, the write-back unit 1020 sequentially writes back, to the main memory 103, data stored in each of the one or more line storage areas specified by the respective pairs and, for each of the one or more line storage areas, updates the logical value of a valid bit stored in the line storage area to "0".

The following describes operations of the first modified virtual machine system having the above structure, with reference to the drawings.
<Operations>

The following describes first modified data storage processing and processing performed upon issuance of a sleep instruction (hereinafter "post-sleep instruction processing"), which are characteristic operations among operations by the first modified virtual machine system.
<First Modified Data Storage Processing>

The first modified data storage processing is processing in which the cache memory 102 newly stores data used by the processor 101 into any of the zeroth way 310 to the third way 313.

Figure 11:
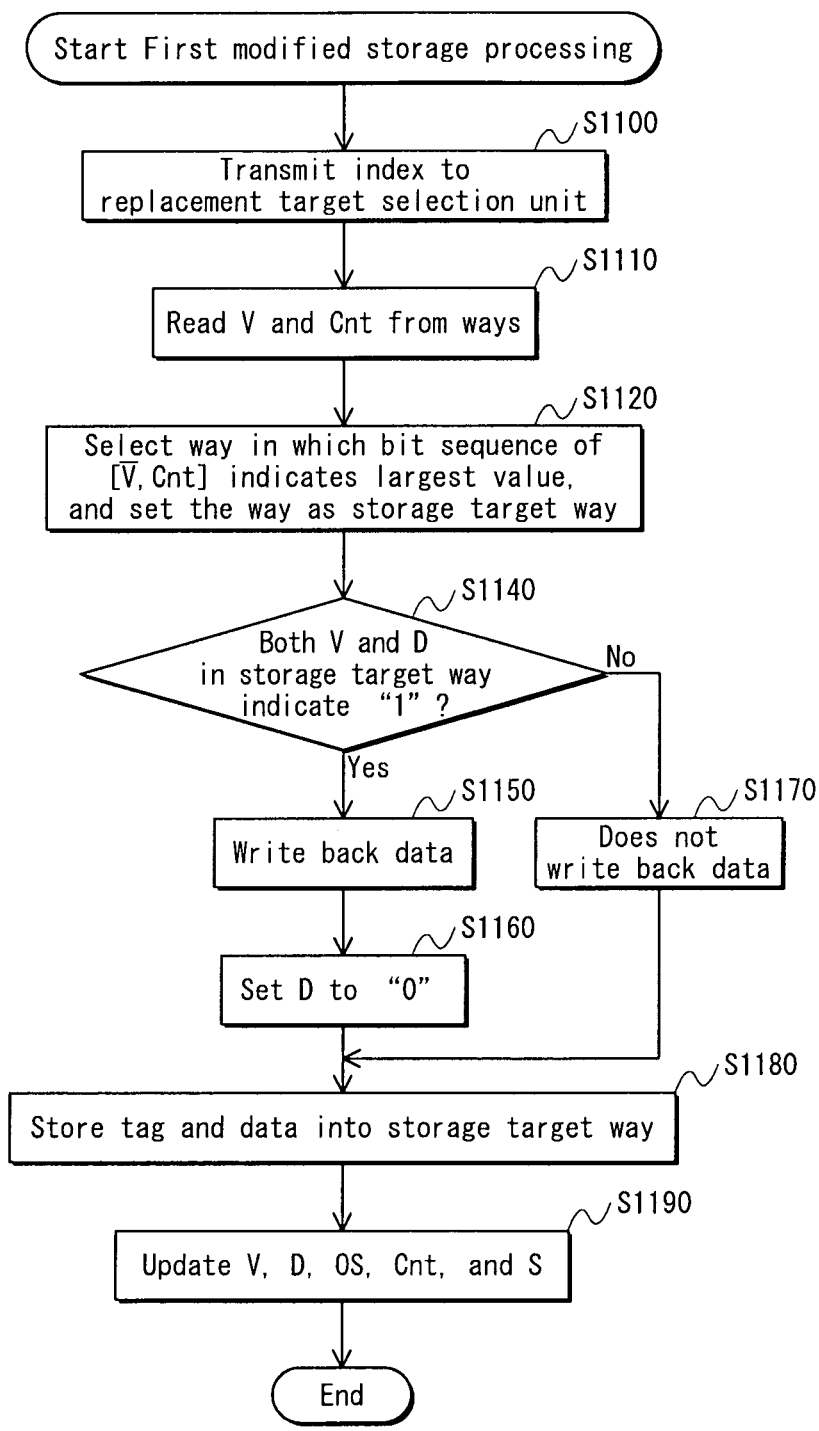
FIG. 11 is a flowchart showing first modified data storage processing.

FIG. 11 is a flowchart showing the first modified data storage processing.

The first modified data storage processing starts when the storage unit 630 receives a tag, an index, and an OS identifier from the processor 101, and further receives data to be stored from either the processor 101 or the main memory 103.

When the first modified data storage processing is started, the storage unit 630 transmits the index received from the processor 101 to the replacement target selection unit 1010 and the write-back unit 620 (step S1100).

Upon receiving the index from the storage unit 630, the replacement target selection unit 1010 reads a valid bit and a counter value stored in each of the line storage areas of the zeroth way 310 to the third way 313 specified by the index (step S1110). Then, the replacement target selection unit 1010 generates, for each of the four ways, a 3-bit selection bit sequence composed of a 1-bit invalid bit and a 2-bit counter value that has been read, the 1-bit invalid bit being an inverse signal of a valid bit that has been read and being the most significant bit, and the 2-bit counter value being the less significant bits, selects, from among the four selection bit sequences thus generated, a way corresponding to the selection bit sequence having the largest value, and transmits a way selection signal specifying the selected way to the write-back unit 1020 (step S1120).

Steps S1140 to S1190 are the same as steps S940 to S990 in the storage processing according to Embodiment 1 (see FIG. 9), except that the replacement target selection unit 610 is replaced with the replacement target selection unit 1010, and the write-back unit 620 is replaced with the write-back unit 1020. Accordingly, explanations thereof are omitted.

When step S1190 is completed, the cache memory 102 ends the first modified data storage processing.

<Post-Sleep Instruction Processing>

The post-sleep instruction processing, performed by the cache memory 102, is processing for freeing all line storage areas each storing a secure bit having a logical value of "1", when the processor 101 has issued a sleep instruction for causing the secure OS to be placed in the sleep state.

Figure 12:
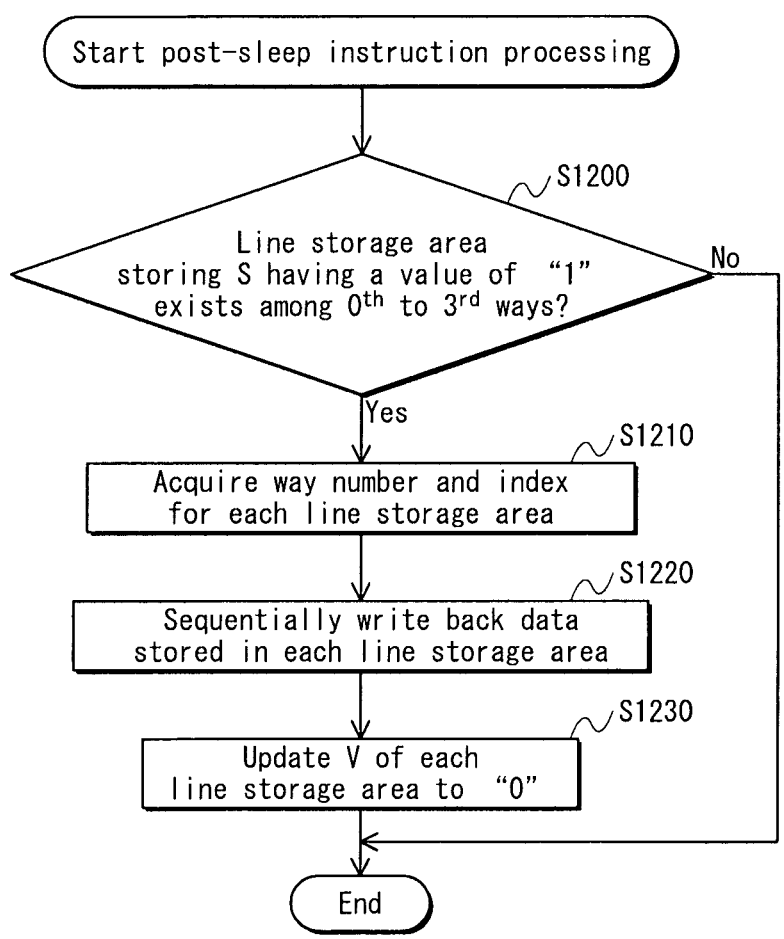
FIG. 12 is a flowchart showing post-sleep instruction processing.

FIG. 12 is a flowchart showing the post-sleep instruction processing.

The post-sleep instruction processing is started when the write-back unit 1020 detects a sleep instruction, issued by the processor 101, for causing the secure OS to be placed in the sleep state.

When the post-sleep instruction processing is started, the write-back unit 1020 checks whether a line storage area storing a secure bit having a logical value of "1" exists among the zeroth way 310 to the third way 313 (step S1200).

If one or more line storage areas each storing a secure bit having a logical value of "1" exist in step S1200 (step S1200: Yes), the write-back unit 1020 acquires, for each of the one or more line storage areas, a way number and an index that specify the line storage area (step S1210). Then, the write-back unit 1020 sequentially writes back, to the main memory 103, data stored in the one or more line storage areas specified by the one or more pairs of a way number and an index thus acquired (step S1220), and updates the logical value of a valid bit of each of the one or more line storage areas specified by the one or more pairs (step S1230).

When step S1230 is completed or when a line storage area storing a secure bit having a logical value of "1" does not exist (step S1200: No), the cache memory 102 ends the post-sleep instruction processing.

<Discussion>

According to the first modified virtual machine system having the above structure, when the processor 101 has issued a sleep instruction for causing the secure OS to be placed in the sleep state, the cache memory 102 collectively frees all the line storage areas each storing a secure bit having a logical value of "1".

As a result, according to the first modified virtual machine system, after the line storage areas each storing a secure bit having a logical value of "1" are freed while the secure OS is in the sleep state, the write-back processing with respect to the secure storage area does not occur while execution of a normal OS is being controlled.

Therefore, as compared to a conventional virtual machine system in which, when a processor has issued a sleep instruction for causing a secure OS to be placed in a sleep state, a cache memory does not collectively free all the line storage areas each storing a secure bit having a logical value of "1", the first modified virtual machine system with the above structure has a higher possibility in reducing the frequency of occurrence of write-back processing with respect to the secure storage area while the execution of a normal OS is being controlled.

Embodiment 3

<General Outline>

As an embodiment of a virtual machine system according to the present invention, the following describes a second modified virtual machine system that is a partial modification to the first modified virtual machine system of Embodiment 2.

The second modified virtual machine system according to Embodiment 3 has the same hardware structure as the first modified virtual machine system according to Embodiment 2, but differs therefrom with respect to some of the programs stored in the internal storage device of the controller 301.

In the first modified virtual machine system according to Embodiment 2, when the processor 101 has issued a sleep instruction for causing the secure OS to be placed in a sleep state, the cache memory 102 collectively frees all line storage areas each storing a secure bit having a logical value of "1". However, according to the first modified virtual machine system, if, for example, the processor 101 issues multiple types of sleep instructions, and each of the sleep instructions belongs to a different power reduction level, the power reduction levels of these sleep instructions are not considered. On the other hand, in the second modified virtual machine system according to Embodiment 3, when the processor 101 has issued a sleep instruction for causing the secure OS to be placed in a sleep state, the cache memory 102 collectively frees some or all of the line storage areas each storing a secure bit having a logical value of "1" and, further, the number of line storage areas to be freed is limited depending on the power level of an issued sleep instruction.

The following describes the second modified virtual machine system according to Embodiment 3, with reference to the drawings and with particular attention to differences from the first modified virtual machine system according to Embodiment 2.

<Structure>

The second modified virtual machine system has the same hardware structure as the first modified virtual machine system according to Embodiment 2. Accordingly, explanations thereof are omitted.

Regarding the second modified virtual machine system, some of the programs stored in the internal storage device of the controller 301 are modified from those in the first modified virtual machine system according to Embodiment 2. As a result, the first modified data storage function realized by the cache memory 102 in the first modified virtual machine system according to Embodiment 2 is modified to a second modified data storage function.

Also, sleep instructions issued by the processor 101 are divided into four types, each belonging to a different power reduction level. Each of the sleep instructions is associated with 2-bit power reduction level information (EV) indicating a power reduction level.

FIG. 13 shows a correspondence table indicating the correspondence between sleep instruction types and pieces of power reduction level information (EV).

As shown in FIG. 13, the correspondence table includes sleep instruction types 1300, power reduction levels 1310, and pieces of power reduction level information (EV) 1320 that are associated with each other.

Each of the sleep instruction types 1300 is a type to which a sleep instruction belongs. The sleep instructions include four types of instructions, i.e., INST0, INST1, INST2, and INST3.

Each of the power reduction levels 1310 indicate the power reduction level of a corresponding sleep instruction type 1300. The power reduction level refers to a level of the depth of sleep. A lower power reduction level indicates that the depth of sleep is deeper.

Each of the pieces of power reduction level information (EV) 1320 is a 2-bit sequence associated with a corresponding sleep instruction type 1300. The lower the corresponding power reduction level of the sleep instruction type 1300, the smaller the value of the piece of power reduction level information (EV) 1320.

The following describes the second modified data storage function, with reference to the drawings.

Figure 14:
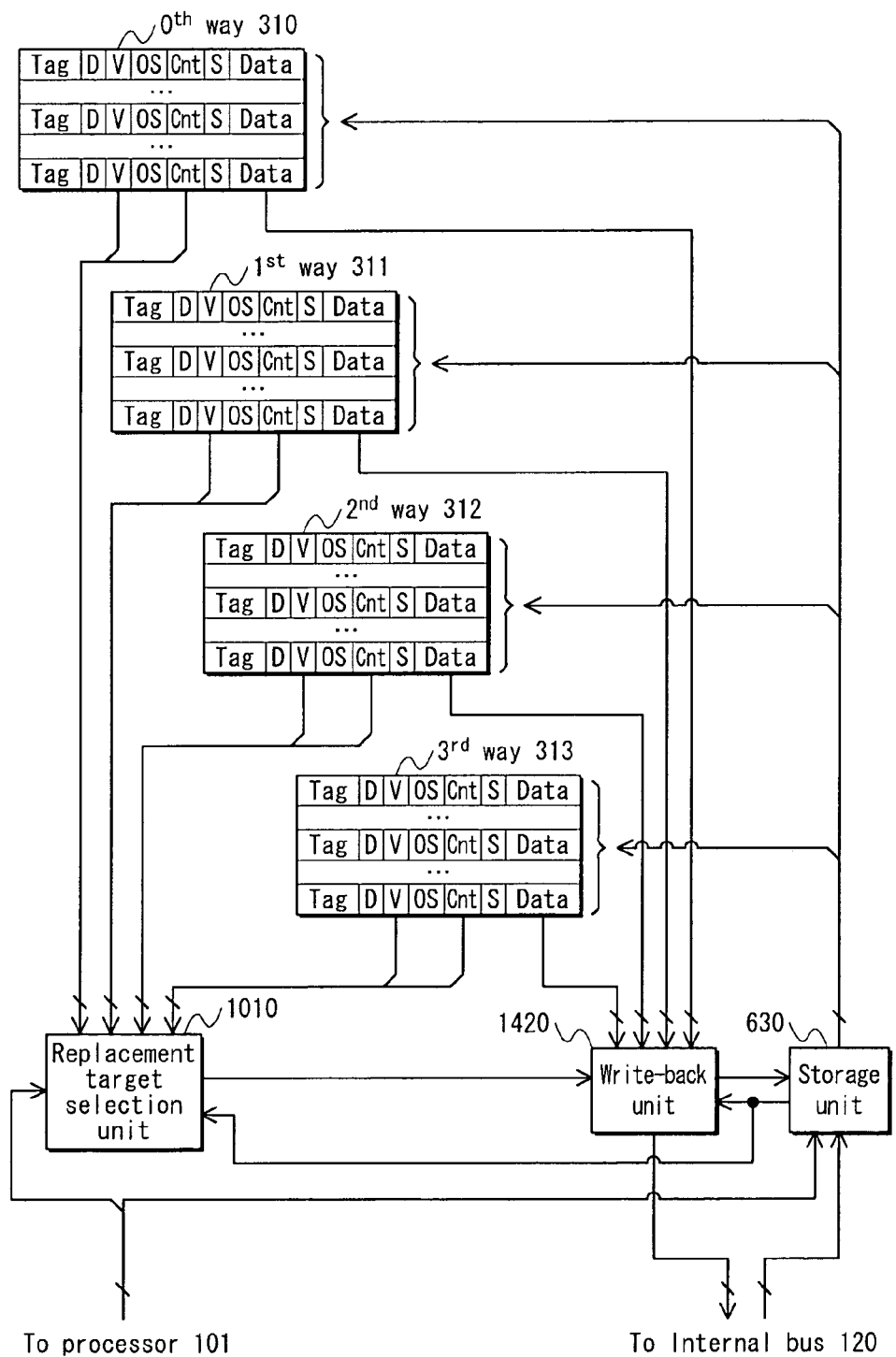
FIG. 14 is a functional block diagram showing a second modified data storage function block.

FIG. 14 is a functional block diagram showing a second modified data storage function block that realizes the second modified data storage function. The second modified data storage function block is realized by the controller 301 executing the programs stored in the internal storage device and controlling the I/O circuit 302, and the zeroth way 310 to the third way 313.

As shown in FIG. 14, the second modified data storage function block differs from the first modified data storage function block according to Embodiment 2 with respect to a write-back unit 1420 which is a modification of the write-back unit 1020.

The write-back unit 1420 is connected to the processor 101, the internal bus 120, the replacement target selection unit 1010, the storage unit 630, and the zeroth way 320 to the third way 313, and has the following two functions in addition to the write-back function, dirty bit update function, and through function of the write-back unit 1020 according to Embodiment 2.

Modified secure bit search function: When the processor 101 issues a sleep instruction for causing the secure OS to be placed in the sleep state, the write-back unit 1420 detects the sleep instruction, and performs modified secure bit search processing, thereby checking whether any of the line storage areas in the zeroth way 310 to the third way 313 satisfies the following conditions: (i) the logical value of the secure bit indicates "1"; and (ii) the counter value is equal to or larger than a piece of power reduction level information (EV) corresponding to the sleep instruction. If one or more line storage areas satisfy the above conditions, the write-back unit 1420 acquires, for each of the one or more line storage areas, a way number and an index specifying the line storage area.

Modified secure data write-back function: After modified secure bit search processing, if having acquired one or more pairs of a way number and an index each specifying a line storage area, the write-back unit 1420 sequentially writes back, to the main memory 103, data stored in each of the one or more line storage areas specified by the respective pairs and, for each of the one or more line storage areas, updates the logical value of a valid bit stored in the line storage area to "0".

The following describes an operation of the second modified virtual machine system having the above structure, with reference to the drawings.
<Operation>

Among operations by the second modified virtual machine system, the following describes first modified post-sleep instruction processing which is a partial modification of the post-sleep instruction processing performed by the first modified virtual machine system according to Embodiment 2.
<First Modified Post-Sleep Instruction Processing>

The first modified post-sleep instruction processing, performed by the cache memory 102, is processing performed when the processor 101 has issued a sleep instruction for causing the secure OS to be placed in the sleep state, and is for freeing all line storage areas that satisfy the following conditions: (i) the logical value of the secure bit indicates "1"; and (ii) the counter value is equal to or larger than a piece of power reduction level information (EV) corresponding to the sleep instruction.

Figure 15:
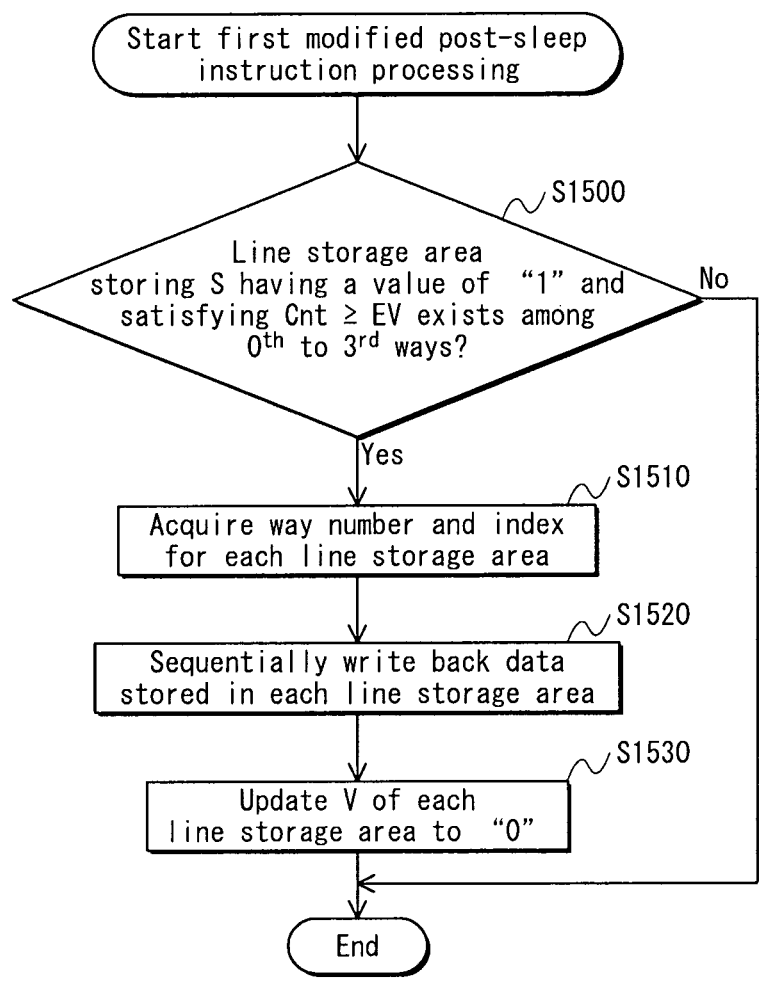
FIG. 15 is a flowchart showing first modified post-sleep instruction processing.

FIG. 15 is a flowchart of the first modified post-sleep instruction processing.

The first modified post-sleep instruction processing is started when the write-back unit 1420 detects a sleep instruction, issued by the processor 101, for causing the secure OS to be placed in the sleep state.

The first modified post-sleep instruction processing differs from the post-sleep instruction processing (see FIG. 12) performed by the first modified virtual machine system according to Embodiment 2, in that step S1200 is replaced with step S1500, and steps S1210 to S1230 are replaced with steps S1510 to S1530. Steps S1510 to S1530 are the same as steps S1210 to S1230 except that the write-back unit 1020 is replaced with the write-back unit 1420. The following describes step S1500.

When the first modified post-sleep instruction processing is started, the write-back unit 1420 checks whether any of the line storage areas in the zeroth way 310 to the third way 313 satisfies the following conditions: (i) the logical value of the secure bit indicates "1"; and (ii) the counter value is equal to or larger than a piece of power reduction level information (EV) corresponding to the detected sleep instruction (step S1500).

If one or more line storage areas satisfying the conditions exist in step S1500 (step S1500: Yes), the processing from step S1510 onward is performed.

When step S1530 is completed or when a line storage area satisfying the conditions does not exist in step S1500 (step S1500: No), the cache memory 102 ends the first modified post-sleep instruction processing.
<Discussion>

As compared to the first modified virtual machine system according to Embodiment 2, the second modified virtual machine system having the above structure can control the number of line storage areas to be freed depending on the type of a sleep instruction.

Embodiment 4

General Outline

As an embodiment of a virtual machine system according to the present invention, the following describes a third modified virtual machine system that is a partial modification to the first modified virtual machine system of Embodiment 2.

The third modified virtual machine system according to Embodiment 4 has the same hardware structure as the first modified virtual machine system according to Embodiment 2, but differs therefrom with respect to some of the programs stored in the internal storage device of the controller 301.

According to the first modified virtual machine system according to Embodiment 2, when the processor 101 has issued a sleep instruction for causing the secure OS to be placed in the sleep state, the cache memory 102 collectively frees all line storage areas each storing a secure bit having a logical value of "1". On the other hand, in the third modified virtual machine system according to Embodiment 4, when the processor 101 has issued a sleep instruction for causing the secure OS to be placed in the sleep state, the cache memory 102 updates, for each line storage area storing a secure bit having a logical value of "1", the counter values in the ways specified by the index corresponding to the line storage area. Specifically, the cache memory 102 updates these counter values in a manner that the counter value of a line storage area storing a secure bit having a logical value of "1" is smaller than the counter value of a line storage area storing a secure bit having a logical value of "0".

The following describes the third modified virtual machine system according to Embodiment 4, with reference to the drawings and with particular attention to differences from the first modified virtual machine system according to Embodiment 2.

<Structure>

The third modified virtual machine system has the same hardware structure as the first modified virtual machine system according to Embodiment 2. Accordingly, explanations thereof are omitted.

Regarding the third modified virtual machine system, some of the programs stored in the internal storage device of the controller 301 are modified from those in the first modified virtual machine system according to Embodiment 2. As a result, the first modified data storage function realized by the cache memory 102 in the first modified virtual machine system according to Embodiment 2 is modified to a third modified data storage function.

The following describes the third modified data storage function, with reference to the drawings.

Figure 16:
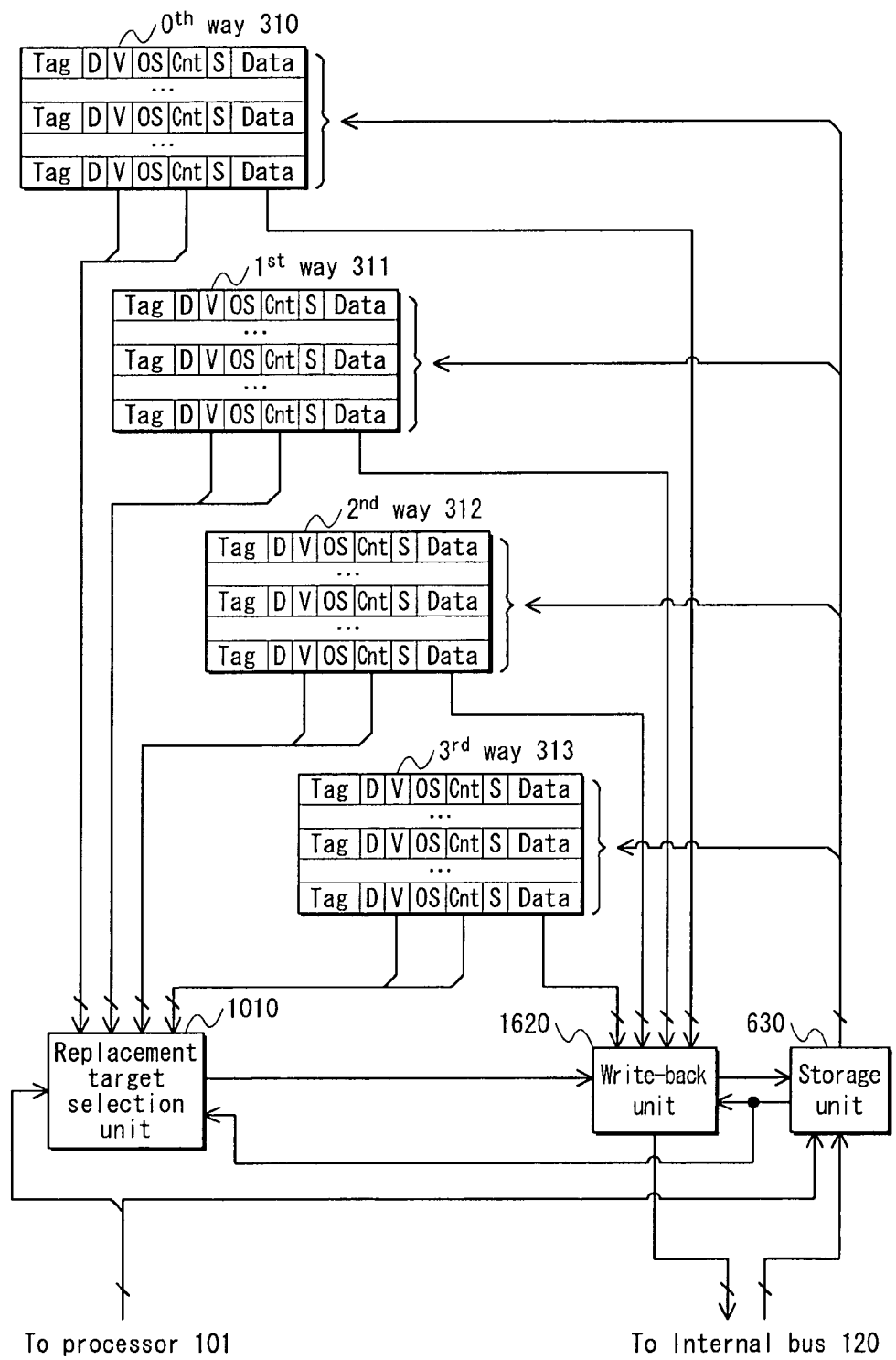
FIG. 16 is a functional block diagram showing a third modified data storage function block.

FIG. 16 is a functional block diagram showing a third modified data storage function block that realizes the third modified data storage function. The third modified data storage function block is realized by the controller 301 executing the programs stored in the internal memory device and controlling the I/O circuit 302, and the zeroth way 310 to the third way 313.

As shown in FIG. 16, the third modified data storage function block differs from the first modified data storage function block according to Embodiment 2 with respect to a write-back unit 1620 which is a modification of the write-back unit 1020.

The write-back unit 1620 is connected to the processor 101, the internal bus 120, the replacement target selection unit 1010, the storage unit 630, and the zeroth way 320 to the third way 313, and has the following two functions in addition to the write-back function, dirty bit update function, and through function of the write-back unit 1020 according to Embodiment 2.

Second modified secure bit search function: When the processor 101 issues a sleep instruction for causing the secure OS to be placed in the sleep state, the write-back unit 1620 detects the sleep instruction, and performs second modified secure bit search processing, thereby checking whether any of the line storage areas in the zeroth way 310 to the third way 313 stores a secure bit having a logical value of "1". If one or more line storage areas each storing a secure bit having a logical value of "1" exist, the write-back unit 1620 acquires, for each of the one or more line storage areas, an index specifying the line storage area.

Counter value update function: After second modified secure bit search processing, if having acquired one or more indexes each specifying a line storage area, the write-back unit 1620 updates, for each index, the counter values in the ways specified by the index, in a manner that the counter value of a line storage area storing a secure bit having a logical value of "1" is smaller than the counter value of a line storage area storing a secure bit having a logical value of "0".

The following describes an operation of the third modified virtual machine system having the above structure, with reference to the drawings.

<Operation>

Among operations by the third modified virtual machine system, the following describes second modified post-sleep instruction processing which is a partial modification of the post-sleep instruction processing performed by the first modified virtual machine system according to Embodiment 2.

<Second Modified Post-Sleep Instruction Processing>

The second modified post-sleep instruction processing, performed by the cache memory 102, is processing performed when the processor 101 has issued a sleep instruction for causing the secure OS to be placed in the sleep state, and is for updating, for each line storage area storing a secure bit having a logical value of "1", the counter values in the ways specified by the index corresponding to the line storage area, the update being performed in a manner that the counter value of a line storage area storing a secure bit having a logical value of "1" is smaller than the counter value of a line storage area storing a secure bit having a logical value of "0".

Figure 17:
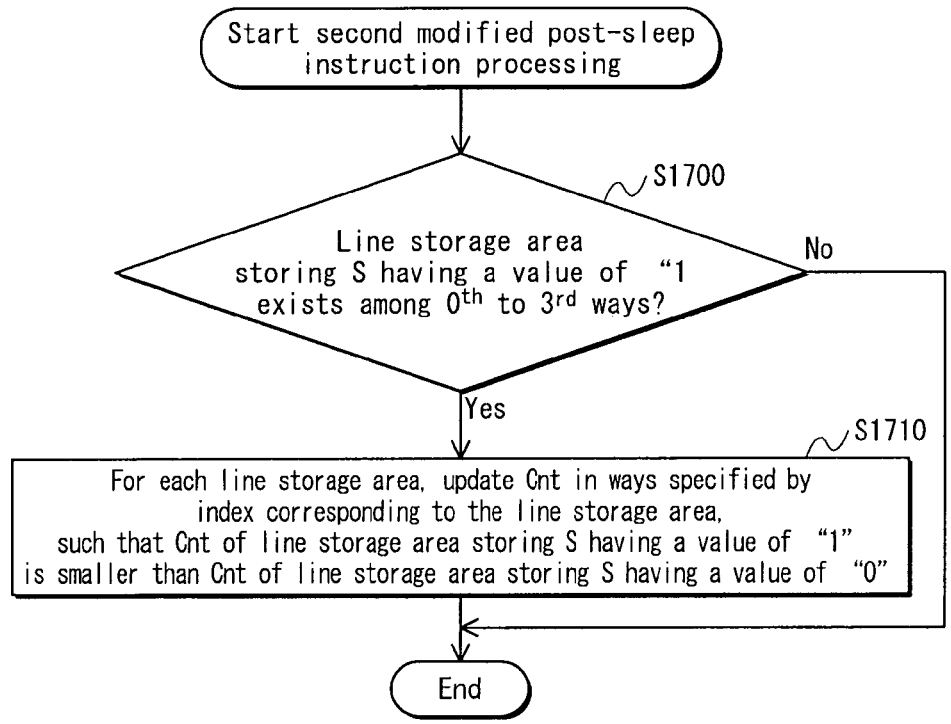
FIG. 17 is a flowchart showing second modified post-sleep instruction processing.

FIG. 17 is a flowchart of the second modified post-sleep instruction processing.

The second modified post-sleep instruction processing is started when the write-back unit 1620 detects a sleep instruction, issued by the processor 101, for causing the secure OS to be placed in the sleep state.

When the second modified post-sleep instruction processing is started, the write-back unit 1620 checks whether any of the line storage areas in the zeroth way 310 to the third way 313 stores a secure bit having a logical value of "1" (step S1700).

If one or more line storage areas each storing a secure bit having a logical value of "1" exist in step S1700 (step S1700: Yes), the write-back unit 1620 updates, for each of the one or more line storage areas, the counter values in the ways specified by the index corresponding to the line storage area, the update being performed in a manner that the counter value of a line storage area storing a secure bit having a logical value of "1" is smaller than the counter value of a line storage area storing a secure bit having a logical value of "0" (step S1710).

When step S1710 is completed or when a line storage area storing a secure bit having a logical value of "1" does not exist in step S1700 (step S1700: No), the cache memory 102 ends the second modified post-sleep instruction processing.

<Discussion>

According to the third modified virtual machine system, when the processor 101 has issued a sleep instruction for causing the secure OS to be placed in the sleep state, the cache memory 102 updates, for each line storage area storing a secure bit having a logical value of "1", the counter values in the ways specified by the index corresponding to the line storage area, the update being performed in a manner that the counter value of a line storage area storing a secure bit having a logical value of "1" is smaller than the counter value of a line storage area storing a secure bit having a logical value of "0". In this way, during a period where the secure OS is in the sleep state, the third modified virtual machine system is more likely to reduce the frequency of occurrence of write-back processing with respect to the secure storage area while the execution of a normal OS is being controlled, in comparison to conventional technology.

Embodiment 5

General Outline

As an embodiment of a virtual machine system according to the present invention, the following describes a fourth modified virtual machine system that is a partial modification to the virtual machine system 100 of Embodiment 1.

The fourth modified virtual machine system according to Embodiment 5 has the same hardware structure as the virtual machine system 100 according to Embodiment 1, but differs therefrom with respect to some of the programs stored in the internal storage device of the controller 301.

Regarding the virtual machine system 100 according to Embodiment 1, when the cache memory 102 newly stores data used by the processor 101, and data in the cache memory 102 needs to be written back to the main memory 103, the virtual machine system 100 preferentially selects, from among the ways, a way storing data that was read from the main memory 103 while the execution of a normal OS currently in the sleep state was being controlled by the processor 101, and writes back the data stored in the selected way to the main memory 103. On the other hand, regarding the fourth modified virtual machine system according to Embodiment 5, when the cache memory 102 newly stores data used by the processor 101, and data in the cache memory 102 needs to be written back to the main memory 103, the fourth modified virtual machine system preferentially selects, as a way from which data is to be written back, a way storing data read from a storage area other than the security storage area of the main memory 103, over a way storing data read from the security storage area.

The following describes the fourth modified virtual machine system according to Embodiment 5, with reference to the drawings and with particular attention to differences from the virtual machine system according to Embodiment 1.

<Structure>

The fourth modified virtual machine system has the same hardware structure as the virtual machine system 100 according to Embodiment 1. Accordingly, explanations thereof are omitted.

Regarding the fourth modified virtual machine system, some of the programs stored in the internal storage device of the controller 301 are modified from those in the virtual machine system 100 according to Embodiment 1. As a result, the data storage function realized by the cache memory 102 in the virtual machine system 100 according to Embodiment 1 is modified to a fourth modified data storage function.

The following describes the fourth modified data storage function, with reference to the drawings.

Figure 18:
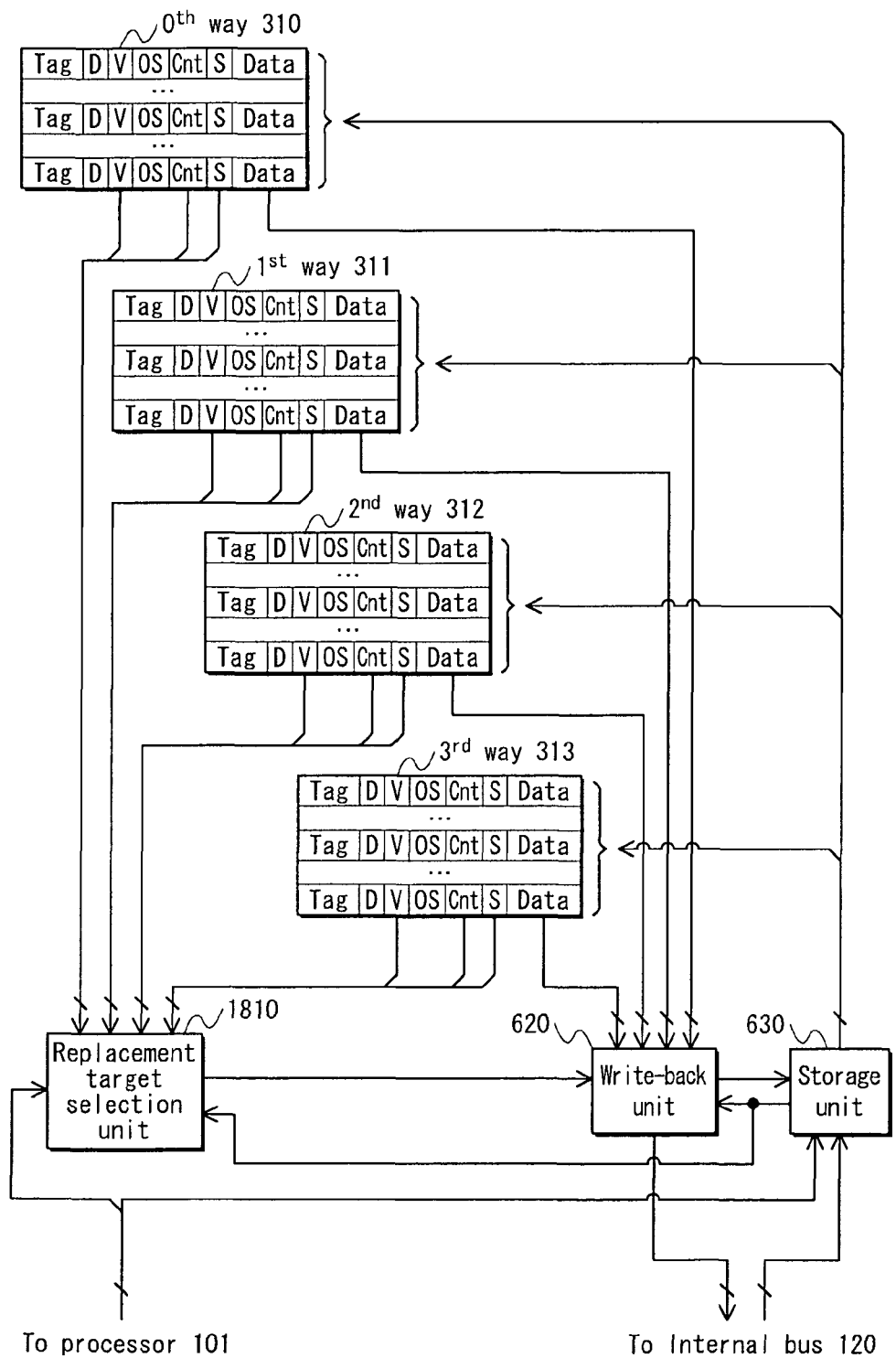
FIG. 18 is a functional block diagram showing a fourth modified data storage function block.

FIG. 18 is a functional block diagram showing a fourth modified data storage function block that realizes the fourth modified data storage function. The fourth modified data storage function block is realized by the controller 301 executing the programs stored in the internal memory device and controlling the I/O circuit 302, and the zeroth way 310 to the third way 313.

As shown in FIG. 18, the fourth modified data storage function block differs from the data storage function block according to Embodiment 1, with respect to a replacement target selection unit 1810 which is a modification of the replacement target selection unit 610.

The replacement target selection unit 1810 is connected to the processor 101, the write-back unit 620, the storage unit 630, and the zeroth way 310 to the third way 313, and has the following two functions.

Second modified read function: Upon receiving an index from the storage unit 630, the replacement target selection unit 1810 performs read processing for reading a valid bit and a counter value stored in each of the line storage areas of the zeroth way 310 to the third way 313 specified by the index thus received.

First modified way selection function: After read processing, the replacement target selection unit 1810 generates, for each of the four ways, a 4-bit modified selection bit sequence composed of a 1-bit invalid bit, a 1-bit non-secure bit, and a 2-bit counter value that has been read, the 1-bit invalid bit being an inverse signal of a valid bit that has been read and being the most significant bit, the 1-bit non-secure bit being an inverse signal of a secure bit that has been read and being an intermediate bit (i.e., a less significant bit), and the 2-bit counter value being the least significant bits. Then, the replacement target selection unit 1810 selects, from among the four modified selection bit sequences thus generated, a way corresponding to the modified selection bit sequence having the largest value, and transmits a way selection signal specifying the selected way to the write-back unit 620. If multiple modified selection bit sequences indicate the largest value, the replacement target selection unit 1810 selects the way having the smallest way number.

The following describes an operation of the fourth modified virtual machine system having the above structure, with reference to the drawings.

<Operation>

The following describes second modified data storage processing which is a characteristic operation among operations by the fourth modified virtual machine system.

<Second Modified Data Storage Processing>

The second modified data storage processing is processing in which the cache memory 102 newly stores data used by the processor 101 into any of the zeroth way 310 to the third way 313.

Figure 19:
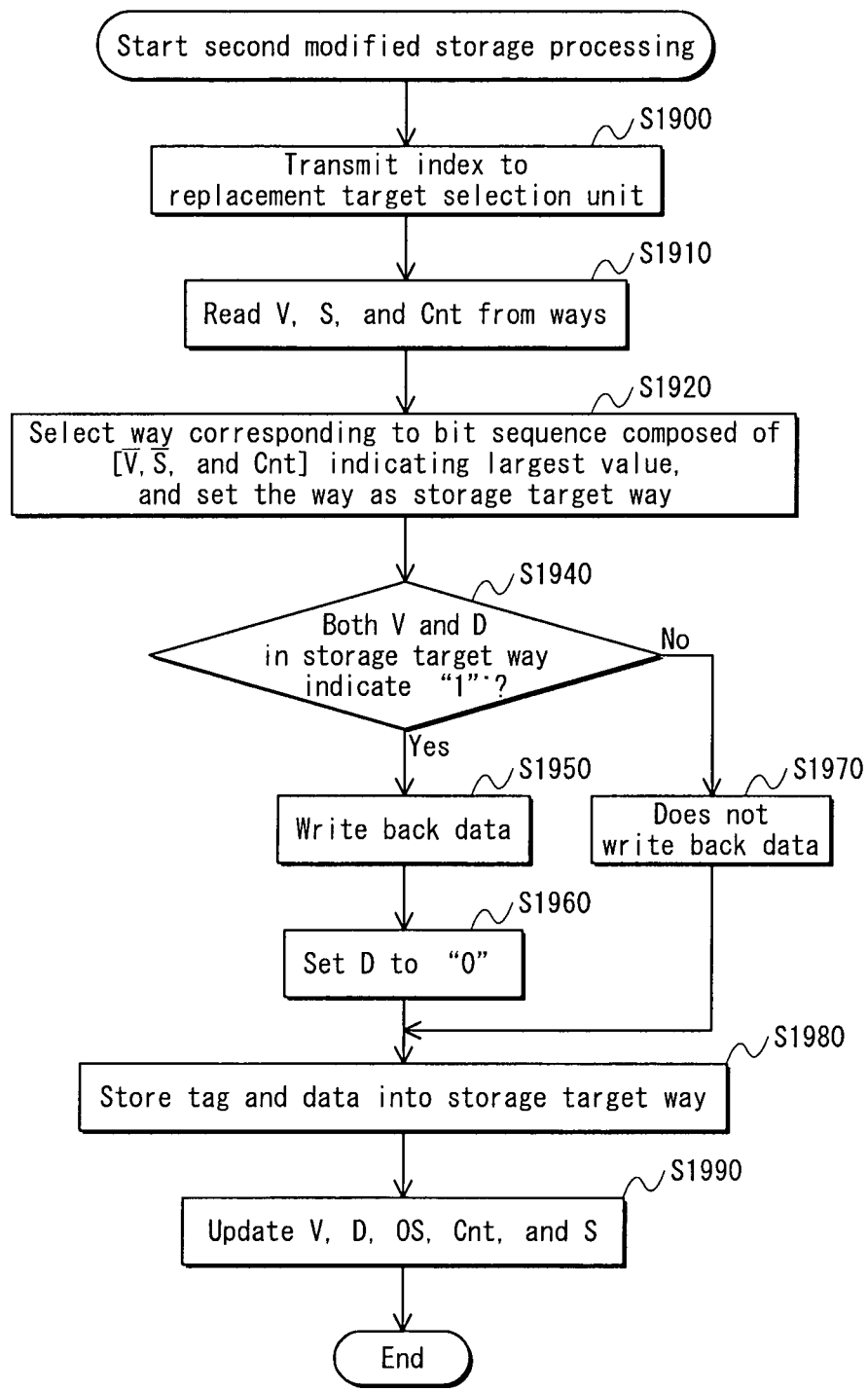
FIG. 19 is a flowchart showing second modified data storage processing.

FIG. 19 is a flowchart showing the second modified data storage processing.

The second modified data storage processing starts when the storage unit 630 receives a tag, an index, and an OS identifier from the processor 101, and further receives data to be stored from either the processor 101 or the main memory 103.

When the second modified data storage processing is started, the storage unit 630 transmits the index received from the processor 101 to the replacement target selection unit 1810 and the write-back unit 620 (step S1900).

Upon receiving the index from the storage unit 630, the replacement target selection unit 1810 reads a valid bit, a secure bit, and a counter value stored in each of the line storage areas of the zeroth way 310 to the third way 313 specified by the index (step S1910). Then, the replacement target selection unit 1810 generates, for each of the four ways, a 4-bit modified selection bit sequence composed of a 1-bit invalid bit, a 1-bit non-secure bit, and a 2-bit counter value that has been read, the 1-bit invalid bit being an inverse signal of a valid bit that has been read and being the most significant bit, the 1-bit non-secure bit being an inverse signal of a secure bit that has been read and being an intermediate bit (i.e., a less significant bit), and the 2-bit counter value being the least significant bits. Then, the replacement target selection unit 1810 selects, from among the four modified selection bit sequences thus generated, a way corresponding to the modified selection bit sequence having the largest value, and transmits a way selection signal specifying the selected way to the write-back unit 620 (step S1920).

Steps S1940 to S1990 are the same as steps S940 to S990 in the storage processing according to Embodiment 1 (see FIG. 9), except that the replacement target selection unit 610 is replaced with the replacement target selection unit 1810. Accordingly, explanations thereof are omitted.

When step S1990 is completed, the cache memory 102 ends the second modified data storage processing.

<Discussion>

According to the fourth modified virtual machine system having the above structure, when the cache memory 102 newly stores data used by the processor 101, and data in the cache memory 102 needs to be written back to the main memory 103, the fourth modified virtual machine system preferentially selects, as a way from which data is to be written back, a way storing data read from a storage area other than the security storage area of the main memory 103, over a way storing data read from the security storage area.

In this way, the fourth modified virtual machine system is more likely to reduce the frequency of occurrence of write-back processing with respect to the secure storage area while the execution of a normal OS is being controlled, in comparison to conventional technology.

Embodiment 6

General Outline

As an embodiment of a virtual machine system according to the present invention, the following describes a fifth modified virtual machine system that is a partial modification to the virtual machine system 100 of Embodiment 1.

The fifth modified virtual machine system according to Embodiment 6 has the same hardware structure as the virtual machine system 100 according to Embodiment 1, but differs therefrom with respect to some of the programs stored in the internal storage device of the controller 301.

Regarding the virtual machine system 100 according to Embodiment 1, when the cache memory 102 newly stores data used by the processor 101, and data in the cache memory 102 needs to be written back to the main memory 103, the virtual machine system 100 preferentially selects, from among the ways, a way storing data that was read from the main memory 103 while the execution of a normal OS currently in the sleep state was being controlled by the processor 101, and writes back the data stored in the selected way to the main memory 103. On the other hand, the fifth modified virtual machine system according to Embodiment 6 distinguishes whether data to be stored in the cache memory 102 has been read from the secure storage area. If the data has been read from a storage area other than the secure storage area, the fifth modified virtual machine system stores the data into either of the zeroth way 310 and the first way 311. If the data has been read from the secure storage area, the fifth modified virtual machine system stores the data into either of the second way 312 and the third way 313.

The following describes the fifth modified virtual machine system according to Embodiment 6, with reference to the drawings and with particular attention to differences from the virtual machine system 100 according to Embodiment 1.

<Structure>

The fifth modified virtual machine system has the same hardware structure as the virtual machine system 100 according to Embodiment 1. Accordingly, explanations thereof are omitted.

Regarding the fifth modified virtual machine system, some of the programs stored in the internal storage device of the controller 301 are modified from those in the virtual machine system 100 according to Embodiment 1. As a result, the data storage function realized by the cache memory 102 in the virtual machine system 100 according to Embodiment 1 is modified to a fifth modified data storage function.

The following describes the fifth modified data storage function, with reference to the drawings.

Figure 20:
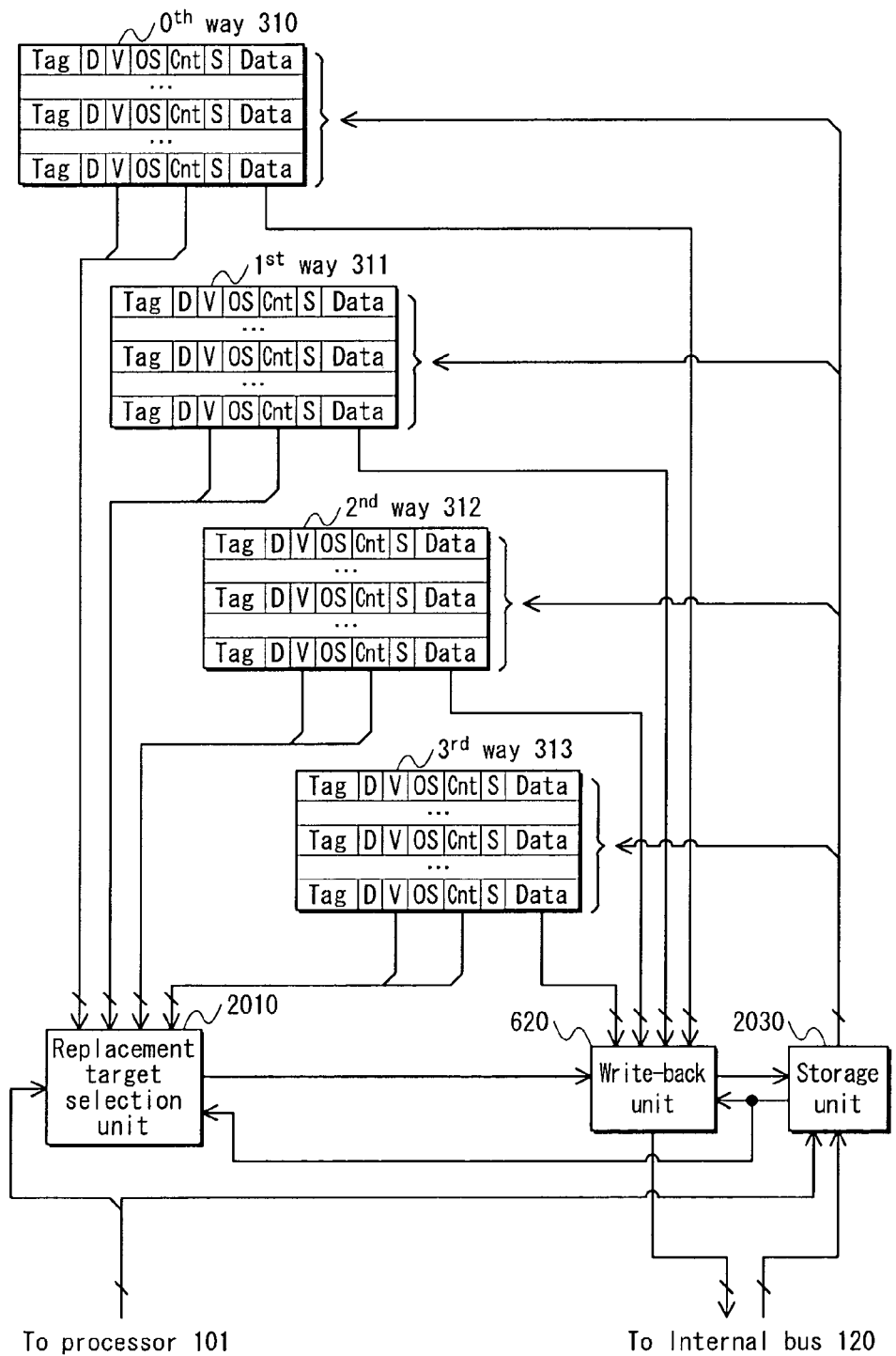
FIG. 20 is a functional block diagram showing a fifth modified data storage function block.

FIG. 20 is a functional block diagram showing a fifth modified data storage function block that realizes the fifth modified data storage function. The fifth modified data storage function block is realized by the controller 301 executing the programs stored in the internal memory device and controlling the I/O circuit 302, and the zeroth way 310 to the third way 313.

As shown in FIG. 20, the fifth modified data storage function block differs from the data storage function block according to Embodiment 1, with respect to a replacement target selection unit 2010 which is a modification of the replacement target selection unit 610, and a storage unit 2030 which is a modification of the storage unit 630.

The replacement target selection unit 2010 is connected to the processor 101, the write-back unit 620, the storage unit 2030, and the zeroth way 310 to the third way 313, and has the following two functions.

Third modified read function: Upon receiving a tag and an index from the storage unit 2030, the replacement target selection unit 2010 checks whether the address composed of the tag and the index indicates the secure storage area. (1) If the address composed of the tag and the index indicates the secure storage area, the replacement target selection unit 2010 performs secure read processing for reading a valid bit and a counter value stored in each of the line storage areas of the zeroth way 310 and the first way 311 specified by the index. (2) If the address composed of the tag and the index indicates a storage area other than the secure storage area, the replacement target selection unit 2010 performs non-secure read processing for reading a valid bit and a counter value stored in each of the second way 312 and the third way 313 specified by the index.

Second modified way selection function: (1) After secure read processing, the replacement target selection unit 2010 generates, for each of the zeroth way 310 and the first way 311, a 3-bit secure selection bit sequence composed of a 1-bit invalid bit and a 2-bit counter value that has been read, the 1-bit invalid bit being an inverse signal of a valid bit that has been read and being the most significant bit, and the 2-bit counter value being the least significant bits. Then, the replacement target selection unit 2010 selects, from between the two secure selection bit sequences thus generated, a way corresponding to the secure selection bit sequence having the larger value, and transmits a way selection signal specifying the selected way to the write-back unit 620. (2) After non-secure read processing, the replacement target selection unit 2010 generates, for each of the second way 312 and the third way 313, a 3-bit non-secure selection bit sequence composed of a 1-bit invalid bit and a 2-bit counter value that has been read, the 1-bit invalid bit being an inverse signal of a valid bit that has been read and being the most significant bit, and the 2-bit counter value being the least significant bits. Then, the replacement target selection unit 2010 selects, from between the two non-secure selection bit sequences thus generated, a way corresponding to the non-secure selection bit sequence having the larger value, and transmits a way selection signal specifying the selected way to the write-back unit 620. If both of the selection bit sequences indicate the same value, the replacement target selection unit 2010 selects the way having the smaller way number.

The storage unit 2030 is connected to the processor 101, the internal bus 120, the replacement target selection unit 2010, and the write-back unit 620, and has a modified index transmission function described below, in addition to the storage function according to Embodiment 1.

Modified index transmission function: When the cache memory 102 newly stores data used by the processor 101, and the storage unit 2030 receives a tag, an index, and an OS identifier from the processor 101, and further receives data to be stored from either the processor 101 or the main memory 103, then the storage unit 2030 transmits the tag and the index thus received to the replacement target selection unit 2010, and the index thus received to the write-back unit 620.

The following describes an operation of the fifth modified virtual machine system having the above structure, with reference to the drawings.

<Operation>

Among operations by the fifth modified virtual machine system, the following describes third modified data storage processing which is a partial modification of the storage processing performed by the virtual machine system 100 according to Embodiment 1.

<Third Modified Data Storage Processing>

The third modified data storage processing is processing in which the cache memory 102 newly stores data used by the processor 101 into any of the zeroth way 310 to the third way 313.

Figure 21:
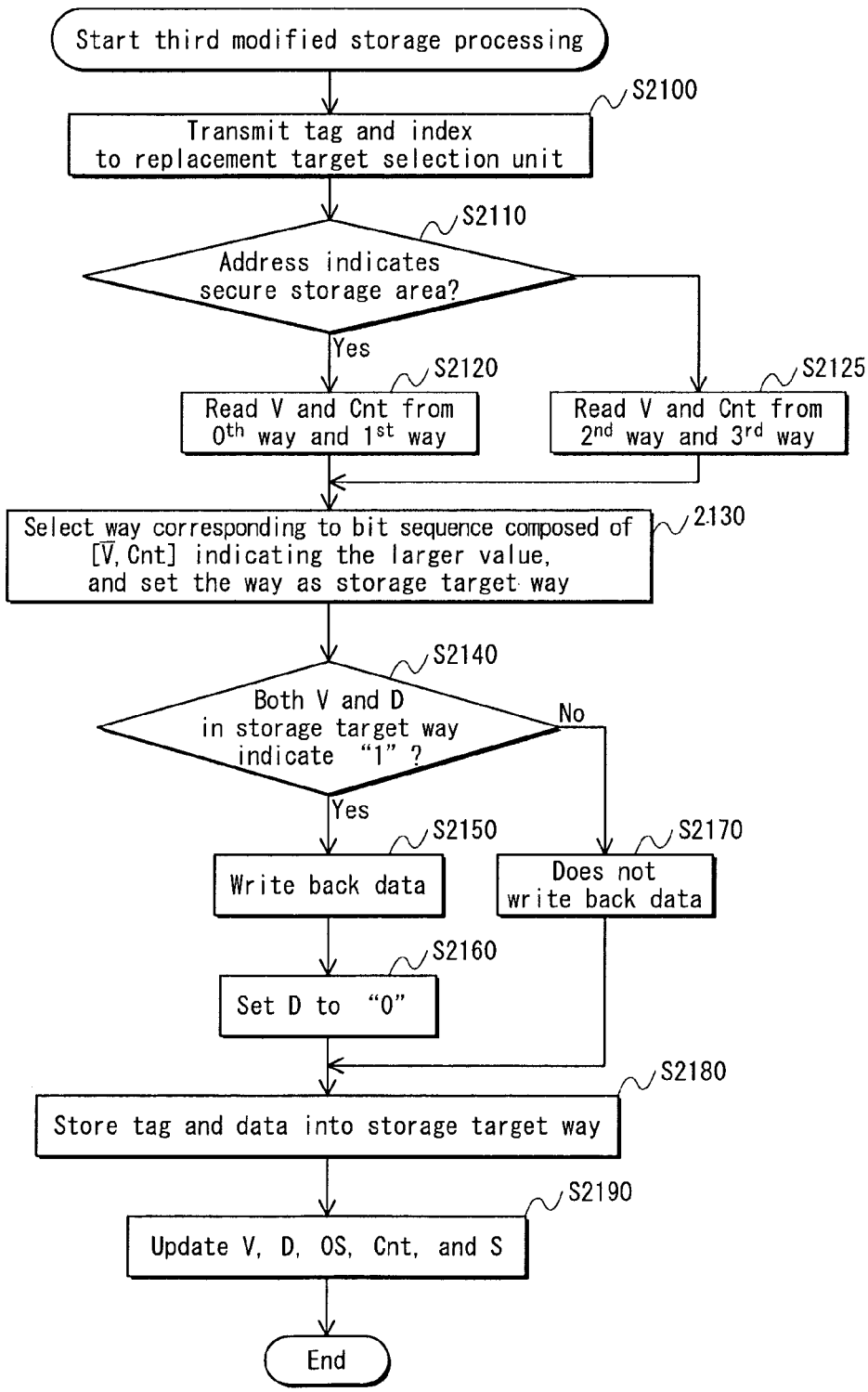
FIG. 21 is a flowchart showing third modified data storage processing.

FIG. 21 is a flowchart showing the third modified data storage processing.

The third modified data storage processing starts when the storage unit 2030 receives a tag, an index, and an OS identifier from the processor 101, and further receives data to be stored from either the processor 101 or the main memory 103.

When the third modified data storage processing is started, the storage unit 2030 transmits the tag and the index received from the processor 101 to the replacement target selection unit 2010, and the index received from the processor 101 to the write-back unit 620 (step S2100).

Upon receiving the tag and the index from the storage unit 2030, the replacement target selection unit 2010 checks whether the address composed of the tag and the index indicates the secure storage area (step S2110).

When the address composed of the tag and the index indicates the secure storage area in step S2110 (step S2110: Yes), the replacement target selection unit 2010 reads a valid bit and a counter bit stored in each of the line storage areas in the zeroth way 310 and the first way 311 specified by the index (step S2120).

When the address composed of the tag and the index indicates a storage area other than the secure storage area in step S2110 (step S2110: No), the replacement target selection unit 2010 reads a valid bit and a counter bit stored in each of the line storage areas in the second way 312 and the third way 313 specified by the index (step S2125).

When either step S2120 or step S2125 is completed, the cache memory 102 performs the processing of step S2140 onward.

Steps S2140 to S2190 are the same as steps S940 to S990 in the storage processing according to Embodiment 1 (see FIG. 9), except that the replacement target selection unit 610 is replaced with the replacement target selection unit 2010, and the storage unit 630 is replaced with the storage unit 2030. Accordingly, explanations thereof are omitted.

When step S2190 is completed, the cache memory 102 ends the third modified data storage processing.

<Discussion>

The fifth modified virtual machine system having the above structure distinguishes whether data to be stored in the cache memory 102 has been read from the secure storage area. If the data has been read from a storage area other than the secure storage area, the fifth modified virtual machine system stores the data into either of the zeroth way 310 and the first way 311. If the data has been read from the secure storage area, the fifth modified virtual machine system stores the data into either of the second way 312 and the third way 313. In this way, write-back processing with respect to the secure storage area does not occur while execution of a normal OS is being controlled.

<Supplementary Remarks>

As embodiments of the virtual machine system according to the present invention, examples of six virtual machine systems have been described in Embodiments 1 to 6. The virtual machine system is not, however, limited to being exactly as described in the above embodiments, and may be modified as follows.

(1) Embodiment 1 describes the virtual machine system 100 as having a single processor. However, provided that the virtual machine system 100 can serve as a virtual machine system, there is no need to limit the quantity of processors as such. Two, three, or more processors may also be used. When a plurality of processors are used, the processors may share a single cache memory, for example. As another example, cache memories may be provided as many as the processors, and each of the processors may use one of the cache memories exclusively.

(2) According to Embodiment 1, the cache memory 102 conforms with the four-way set associative method. However, the number of ways in the cache memory is not limited to four, as long as the cache memory conforms with a set associative method. For example, the cache memory may include eight ways or two ways.

(3) According to Embodiment 1, the processor 101 has three privileged modes, i.e., the normal privileged mode, the secure mode, and the hypervisor mode, and the normal OSs are executed in the normal privileged mode, the secure OS is executed in the secure mode, and the hypervisor is executed in the hypervisor mode. However, the number of privileged modes of the processor 101 is not limited to three, as long as the secure OS is executed in a higher privileged mode than the privileged mode in which the normal OSs are executed. For example, the processor may include two privileged modes, i.e., a lower privileged mode and a higher privileged mode. The normal OSs may be executed in the lower privileged mode, whereas the secure OS and the hypervisor may be executed in the higher privileged mode. As another example, the processor may include four privileged modes.

(4) According to Embodiment 1, each of the zeroth reference time calculation unit 700 to the third reference time calculation unit 730 includes the free level table storage unit storing the free level table. However, the zeroth reference time calculation unit 700 to the third reference time calculation unit 730 do not need to include the respective free level table storage units, as long as they can refer to the free level table. For example, instead of the structure where the zeroth reference time calculation unit 700 to the third reference time calculation unit 730 have the respective free level table storage units, the replacement target selection unit 610 may include a single free level table storage unit, and the zeroth reference time calculation unit 700 to the third reference time calculation unit 730 may refer to the free level table stored in the free level table storage unit of the replacement target selection unit 610.

(5) According to Embodiment 1, the following circuits are integrated into the single integrated circuit 110: the processor 101; the cache memory 102; the main memory 103; the MPU 104; the peripheral circuit 105; the ROM 106; the first interface 107; the second interface 108; and the internal bus 120. However, these circuits need not be integrated into a single integrated circuit. For example, the processor 101 and the cache memory 102 may be integrated into a first integrated circuit while the remaining circuits are integrated into a second integrated circuit, or each individual circuit may be integrated into a separate integrated circuit.

(6) The following describes the structure of a virtual machine system relating to an embodiment of the present invention, modifications of the embodiment, and effects of the embodiment and the modifications.

(a) One embodiment of the present invention provides a virtual machine system including: a processor having a first mode and a second mode; a first operating system executed by the processor in the first mode; and a second operating system executed by the processor in the second mode, the virtual machine system comprising: a write control unit configured to permit writing of data into a predetermined secure storage area in an external main memory, only when the processor is in the first mode; and a cache memory having a plurality of ways for storing data read by the processor from the main memory, the cache memory including: a data storage unit configured to, when the processor has read data from the main memory, store the data into any of the plurality of ways that is ready to newly store data, in a manner that allows for identification of whether the data has been read from the secure storage area; and a write-back unit configured to identify whether data has been read from the secure storage area, and write back data stored in at least one of the ways to the main memory with use of a predetermined algorithm according to a result of the identification, the writing back being performed in a manner that reduces the number of times data stored in each of the ways is intermittently written back to the secure storage area, the writing back to the secure storage area occurring when the processor executing the second operating system accesses the main memory, and being for causing the at least one of the ways to be ready to newly store data.

With the above structure, the virtual machine system according to the present embodiment reduces the number of times write-back processing with respect to the secure storage area (i.e., secure area) is intermittently performed, while the processor in the second mode (normal privileged mode) is executing the second operating system (normal OS).

In this way, the virtual machine system is more likely to reduce the frequency of occurrence of write-back processing with respect to the secure storage area while the execution of the normal OS is being controlled, in comparison to conventional technology.

Figure 22:
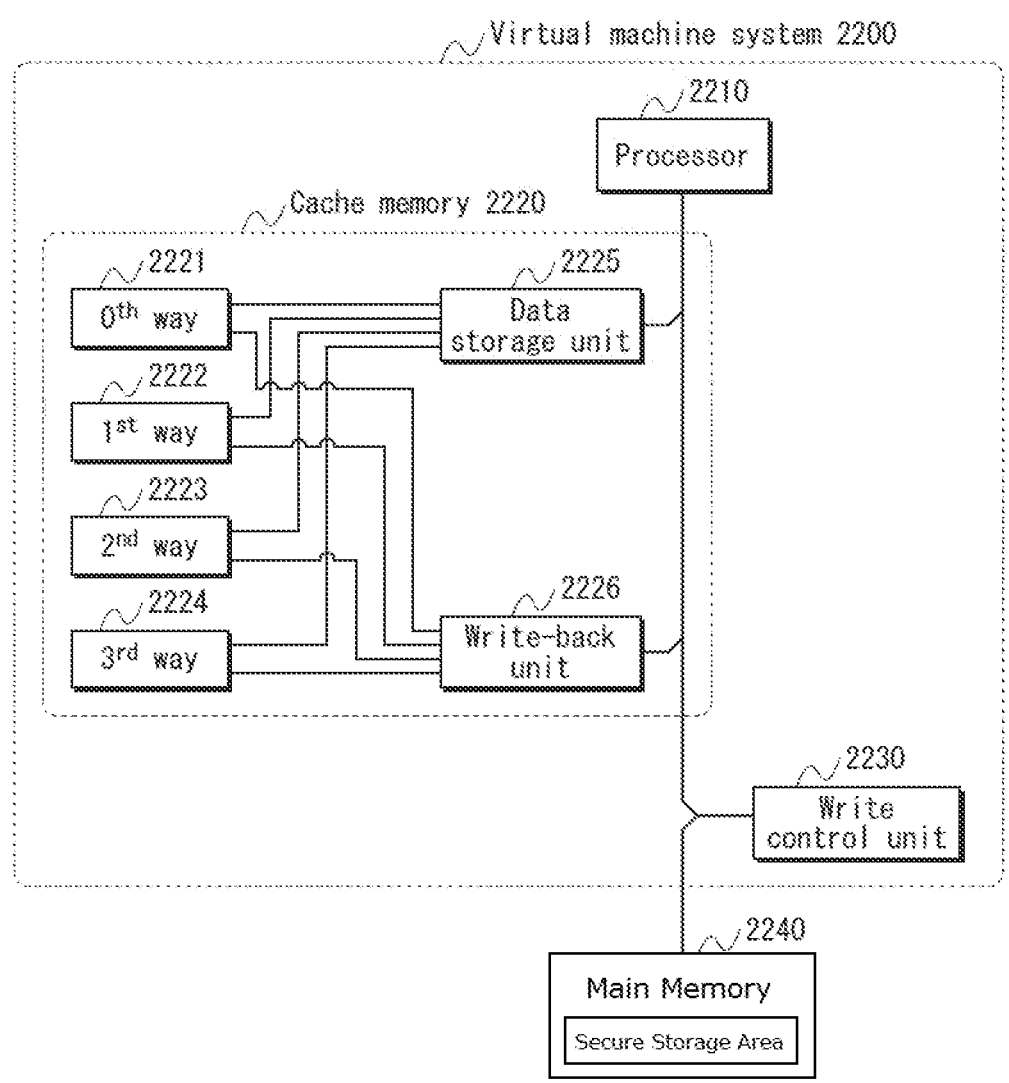
FIG. 22 is a block diagram showing a virtual machine system according to a modification.

FIG. 22 shows the general structure of a virtual machine system 2200 according to the above modification.

As shown in FIG. 22, the virtual machine system 2200 includes a processor 2210, a cache memory 2220, and a write control unit 2230. The cache memory 2220 includes a zeroth way 2221, a first way 2222, a second way 2223, a third way 2224, a data storage unit 2225, and a write-back unit 2226.

The processor 2210 is connected to the data storage unit 2225, the write-back unit 2226, and the write control unit 2230. The processor 2210 has a first mode and a second mode, and executes a first operating system in the first mode, and executes a second operating system in the second mode.

For example, the processor 2210 may be realized as the processor 101 (see FIG. 1) according to Embodiment 1. For example, the first mode may be realized as the secure mode 230 (see FIG. 2) of the processor 101 according to Embodiment 1. For example, the second mode may be realized as the normal privileged mode 220 (see FIG. 2) of the processor 101 according to Embodiment 1. For example, the first operating system may be realized as the secure OS 231 (see FIG. 2) according to Embodiment 1. For example, the second operating system may be realized as the first OS 221 (see FIG. 2) according to Embodiment 1.

The write control unit 2230 is connected to the processor 2210, the data storage unit 2225, the write-back unit 2226, and an external main memory 2240, and permits writing of data into a predetermined secure storage area in the main memory 2240, only when the processor 2210 is in the first mode. For example, the write control unit 2230 may be realized as the MPU 104 (see FIG. 1) of Embodiment 1.

The zeroth way 2221 is connected to the data storage unit 2225 and the write-back unit 2226, and stores data read by the processor 2210 from the external main memory 2240. For example, the zeroth way 2221 may be realized as the zeroth way 310 (see FIG. 3) of Embodiment 1.

The first way 2222 is connected to the data storage unit 2225 and the write-back unit 2226, and stores data read by the processor 2210 from the external main memory 2240. For example, the first way 2222 may be realized as the first way 311 (see FIG. 3) of Embodiment 1.

The second way 2223 is connected to the data storage unit 2225 and the write-back unit 2226, and stores data read by the processor 2210 from the external main memory 2240. For example, the second way 2223 may be realized as the second way 312 (see FIG. 3) of Embodiment 1.

The third way 2224 is connected to the data storage unit 2225 and the write-back unit 2226, and stores data read by the processor 2210 from the external main memory 2240. For example, the third way 2224 may be realized as the third way 313 (see FIG. 3) of Embodiment 1.

The data storage unit 2225 is connected to the zeroth way 2221, the first way 2222, the second way 2223, the third way 2224, the processor 2210, and the write control unit 2230. When the processor 2210 has read data from the main memory 2240, the data storage unit 2225 stores the data into any of the zeroth way 2221 to the third way 2224 that is ready to newly store data, in a manner that allows for identification of whether the data has been read from the secure storage area. For example, the data storage unit 2225 may be realized as the storage unit 630 (see FIG. 6) of Embodiment 1.

The write-back unit 2226 is connected to the zeroth way 2221, the first way 2222, the second way 2223, the third way 2224, the processor 2210, and the write control unit 2230. The write-back unit 2226 identifies whether data has been read from the secure storage area, and writes back data stored in at least one of the zeroth way 2221 to the third way 2224 to the main memory 2240 with use of a predetermined algorithm according to a result of the identification. The writing back is performed in a manner that reduces the number of times data stored in each of the zeroth way 2221 to the third way 2224 is intermittently written back to the secure storage area. The writing back to the secure storage area occurs when the processor 2210 executing the second operating system accesses the main memory 2240, and is for causing the at least one of the ways to be ready to newly store data. For example, the write-back unit 2226 may be realized as a block composed of the replacement target selection unit 610 (see FIG. 6) and the write-back unit 620 (see FIG. 6) of Embodiment 1.

(b) The cache memory may further include a plurality of secure identification information storage areas each being for storing secure identification information indicating that data to be stored has been read from the secure storage area. Only when the processor has read data from the secure storage area of the main memory and the data storage unit stores the data into any of the plurality of ways, the data storage unit may associate the secure identification information with the data, and store the secure identification information into a corresponding one of the secure identification information storage areas, thereby allowing for the identification of whether data has been read from the secure storage area.

This structure enables identification of whether data stored in a way has been read from the secure storage area, by performing relatively simple processing of checking whether the secure identification information is stored in the secure identification information storage area corresponding to the data.

(c) Each of the ways may include a plurality of line storage areas each being for storing data read from the main memory and being specified by an index, the index being a predetermined part of a bit sequence of an address specifying a storage area of the main memory. The data storage unit may store data read by the processor from the main memory into a line storage area of a way that is ready to newly store data, from among line storage areas specified by an index included in an address, the address being specified by the processor when the processor reads the data from the main memory. The cache memory may further include: a plurality of dirty information storage areas corresponding one-to-one to the line storage areas, and each being for storing dirty information indicating that coherency is not ensured between data in the line storage area and the main memory; and a dirty information storage control unit configured to, only when coherency is not ensured between data stored in any of the line storage areas and the main memory, causes the dirty information to be stored into a dirty information storage area corresponding to the line storage area. The predetermined algorithm may be for when the processor executing the first operating system has issued a power reduction instruction, and for sequentially writing back data into the secure storage area, the data being stored in each of the line storage areas in which (i) the dirty information storage area stores the dirty information and (ii) the secure identification information storage area stores the secure identification information.

In this way, when the processor executing the first operating system has issued the power reduction instruction, all data read from the secure storage area, from among the data stored in the line storage areas of the cache memory, is written back to the secure storage area. As a result, data targeted for write-back processing with respect to the secure storage area no longer exists in the cache memory.

(d) The power reduction instruction may belong to any of a plurality of power reduction levels. The cache memory may further include a plurality of priority storage areas corresponding one-to-one to the line storage areas, and each being for storing a priority for causing any of the line storage areas specified by the same index to be ready to newly store data. The write-back unit may write back only data stored in each of the line storage areas in which the priority stored in the priority storage area is equal to or higher than a predetermined priority determined by the power reduction level belonging to the power reduction instruction that has been issued.

The above structure enables a limitation on data targeted for write-back processing with respect to the secure storage area, depending on the power reduction level of the power reduction instruction.

(e) Each of the ways may include a plurality of line storage areas each being for storing data read from the main memory and being specified by an index, the index being a predetermined part of a bit sequence of an address specifying the memory area of the main memory. The data storage unit may store data read by the processor from the main memory into a line storage area of a way that is ready to newly store data, from among line storage areas specified by an index included in an address, the address being specified by the processor when the processor reads the data from the main memory. The cache memory may further include: a plurality of priority storage areas corresponding one-to-one to the line storage areas, and each being for storing a priority for causing any of the line storage areas specified by the same index to be ready to newly store data; and an update unit configured to, when the data storage unit stores data in any of the line storage areas, update, for each line storage area specified by an index corresponding to the line storage area to which the data is to be stored, the priority stored in the priority storage area, the updating being performed in a manner that a priority of a line storage area whose secure identification information storage area stores the secure identification information is lower than a priority of a line storage area whose secure identification information storage area does not store the secure identification information. The predetermined algorithm may be for referring to the priority stored in each of the priority storage areas, and writing back data stored in a line storage area having the highest priority among line storage areas specified by the same index.

With the above structure, when write-back processing of data with respect to the main memory occurs, data read from the storage area other than the secure storage area is prioritized as a target for the write-back processing over data read from the secure storage area.

(f) Each of the ways may include a plurality of line storage areas each being for storing data read from the main memory and being specified by an index, the index being a predetermined part of a bit sequence of an address specifying the memory area of the main memory. The data storage unit may store data read by the processor from the main memory into a line storage area of a way that is ready to newly store data, from among line storage areas specified by an index included in an address, the address being specified by the processor when the processor reads the data from the main memory. The cache memory may further include: a plurality of priority storage areas corresponding one-to-one to the line storage areas, and each being for storing a priority for causing any of the line storage areas specified by the same index to be ready to newly store data; and an update unit configured to, when the processor executing the first operating system has issued a power reduction instruction, update the priority stored in each of the line storage areas in a manner that a priority of a line storage area whose secure identification information storage area stores the secure identification information is lower than a priority of a line storage area whose secure identification information storage area does not store the secure identification information. The predetermined algorithm may be for referring to the priority stored in each of the priority storage areas, and writing back data stored in a line storage area having the highest priority among line storage areas specified by the same index.

With the above structure, when the processor executing the first operating system has issued the power reduction instruction, and write-back processing of data with respect to the main memory occurs, data read from the storage area other than the secure storage area is prioritized as a target for the write-back processing over data read from the secure storage area.

(g) Each of the ways may include a plurality of line storage areas each being for storing data read from the main memory and being specified by an index, the index being a predetermined part of a bit sequence of an address specifying the memory area of the main memory. The data storage unit may store data read by the processor from the main memory into a line storage area of a way that is ready to newly store data, from among line storage areas specified by an index included in an address, the address being specified by the processor when the processor reads the data from the main memory. The cache memory may further include: a plurality of priority storage areas corresponding one-to-one to the line storage areas, each being for storing a priority among line storage areas specified by an index included in an address, the address being specified by the processor when the processor reads data from the main memory, and the priority being for causing any of the line storage areas specified by the same index to be ready to newly store data; and a priority storage unit configured to, when execution of the second operating system is controlled in a sleep state, and the processor reads data from the main memory by specifying an address, (i) generate a priority for each line storage area specified by an index included in the address in a manner that a priority of a line storage area storing data read by the processor executing the second operating system is lower than a priority of a line storage area storing data read by the processor executing the first operating system, and (ii) store the priorities thus generated into priority storage areas corresponding to the line storage areas specified by the index included in the address. The predetermined algorithm may be for referring to the priority stored in each of the priority storage areas, and writing back data stored in a line storage area having the highest priority among line storage areas specified by an index included in an address, the address being specified by the processor when the processor reads data from the main memory.

With the above structure, when execution of the second operating system is controlled in the sleep state and write-back processing of data with respect to the main memory occurs, data read by the processor executing the second operating system is prioritized as a target for the write-back processing over data read by the processor executing the first operating system.

(h) The plurality of ways may include a first way and a second way. The data storage unit may store only data read from the secure storage area into the first way, and may store only data read from a storage area other than the secure storage area into the second way, thereby allowing for the identification of whether data has been read from the secure storage area. The predetermined algorithm may be for setting the second way as a target way from which data is written back to the main memory, when data in any of the ways needs to be written back to the main memory so as to store the data read from the storage area other than the secure storage area.

With this structure, write-back processing with respect to the secure storage area does not occur while the processor in the second mode is executing the second operating system.

INDUSTRIAL APPLICABILITY

The present invention is widely applicable to virtual machine systems having a cache memory.

REFERENCE SIGNS LIST 100 virtual machine system
110 integrated circuit
101 processor
102 cache memory
103 main memory
104 MPU
105 peripheral circuit
106 ROM
107 first interface
108 second interface
130 input device
140 output device
610 replacement target selection unit
620 write-back unit
630 storage unit

The invention claimed is:

1. A virtual machine system comprising:
a processor having a first mode and a second mode, the processor executing a first operating system in the first mode, and the processor executing a second operating system executed in the second mode;
write control circuitry that permits writing of data into a predetermined secure storage area in an external main memory, the writing of data into the secure storage area only being permitted when the processor is in the first mode; and
a cache memory having a plurality of ways for storing data read by the processor from the main memory, wherein the cache memory includes:
data storage circuitry that, when the processor has read data from the main memory, stores the data into any of the plurality of ways that is ready to newly store data, in a manner that allows for identification of whether the data has been read from the secure storage area; and
write-back circuitry that (i) identifies whether data has been read from the secure storage area and (ii) writes back data stored by the data storage circuitry to the main memory with use of a predetermined algorithm according to a result of the identification, such that the number of times data stored in each of the ways is intermittently written back to the secure storage area is reduced and the number of times the processor is switched from the second mode to the first mode to perform writing of data to the secure storage area is reduced, and
when the processor executing the second operating system accesses the main memory, the write-back circuitry writes back, to the secure storage area, data that is identified as having been read from the secure storage area and that is stored in at least one of the ways by (i) causing the processor to switch from the second mode to the first mode and (ii) writing, to the secure storage area, the data that is identified as having been read from the secure storage area and that is stored in at least one of the ways so that the at least one of the ways is ready to newly store data.

2. The virtual machine system of claim 1, wherein
the cache memory further includes a plurality of secure identification information storage areas each being for storing secure identification information indicating that data to be stored has been read from the secure storage area, and
only when the processor has read data from the secure storage area of the main memory and the data storage circuitry stores the data into any of the plurality of ways, the data storage circuitry associates the secure identification information with the data, and stores the secure identification information into a corresponding one of the secure identification information storage areas, thereby allowing for the identification of whether data has been read from the secure storage area.

3. The virtual machine system of claim 2, wherein
each of the ways includes a plurality of line storage areas each being for storing data read from the main memory and being specified by an index, the index being a predetermined part of a bit sequence of an address specifying a storage area of the main memory,
the data storage circuitry stores data read by the processor from the main memory into a line storage area of a way that is ready to newly store data, from among line storage areas specified by an index included in an address, the address being specified by the processor when the processor reads the data from the main memory,
the cache memory further includes:
  a plurality of dirty information storage areas corresponding one-to-one to the line storage areas, and each being for storing dirty information indicating that coherency is not ensured between data in the line storage area and the main memory; and
  dirty information storage control circuitry that, only when coherency is not ensured between data stored in any of the line storage areas and the main memory, causes the dirty information to be stored into a dirty information storage area corresponding to the line storage area, and
the predetermined algorithm is for when the processor executing the first operating system has issued a power reduction instruction, and for sequentially writing back data into the secure storage area, the data being stored in each of the line storage areas in which (i) the dirty information storage area stores the dirty information and (ii) the secure identification information storage area stores the secure identification information.

4. The virtual machine system of claim 3, wherein
the power reduction instruction belongs to any of a plurality of power reduction levels,
the cache memory further includes a plurality of priority storage areas corresponding one-to-one to the line storage areas, and each being for storing a priority for causing any of the line storage areas specified by the same index to be ready to newly store data, and
the write-back circuitry writes back only data stored in each of the line storage areas in which the priority stored in the priority storage area is equal to or higher than a predetermined priority determined by the power reduction level belonging to the power reduction instruction that has been issued.

5. The virtual machine system of claim 2, wherein
each of the ways includes a plurality of line storage areas each being for storing data read from the main memory and being specified by an index, the index being a predetermined part of a bit sequence of an address specifying the memory area of the main memory,
the data storage circuitry stores data read by the processor from the main memory into a line storage area of a way that is ready to newly store data, from among line storage areas specified by an index included in an address, the address being specified by the processor when the processor reads the data from the main memory,
the cache memory further includes:
  a plurality of priority storage areas corresponding one-to-one to the line storage areas, and each being for storing a priority for causing any of the line storage areas specified by the same index to be ready to newly store data; and
  update circuitry that, when the data storage circuitry stores data in any of the line storage areas, updates, for each line storage area specified by an index corresponding to the line storage area to which the data is to be stored, the priority stored in the priority storage area, the updating being performed in a manner that a priority of a line storage area whose secure identification information storage area stores the secure identification information is lower than a priority of a line storage area whose secure identification information storage area does not store the secure identification information, and
the predetermined algorithm is for referring to the priority stored in each of the priority storage areas, and writing back data stored in a line storage area having the highest priority among line storage areas specified by the same index.

6. The virtual machine system of claim 2, wherein
each of the ways includes a plurality of line storage areas each being for storing data read from the main memory and being specified by an index, the index being a predetermined part of a bit sequence of an address specifying the memory area of the main memory,
the data storage circuitry stores data read by the processor from the main memory into a line storage area of a way that is ready to newly store data, from among line storage areas specified by an index included in an address, the address being specified by the processor when the processor reads the data from the main memory,
the cache memory further includes:
  a plurality of priority storage areas corresponding one-to-one to the line storage areas, and each being for storing a priority for causing any of the line storage areas specified by the same index to be ready to newly store data; and
  update circuitry that, when the processor executing the first operating system has issued a power reduction instruction, updates the priority stored in each of the line storage areas in a manner that a priority of a line storage area whose secure identification information storage area stores the secure identification information is lower than a priority of a line storage area whose secure identification information storage area does not store the secure identification information, and
the predetermined algorithm is for referring to the priority stored in each of the priority storage areas, and writing back data stored in a line storage area having the highest priority among line storage areas specified by the same index.

7. The virtual machine system of claim 2, wherein
each of the ways includes a plurality of line storage areas each being for storing data read from the main memory and being specified by an index, the index being a predetermined part of a bit sequence of an address specifying the memory area of the main memory,
the data storage circuitry stores data read by the processor from the main memory into a line storage area of a way that is ready to newly store data, from among line storage areas specified by an index included in an address, the address being specified by the processor when the processor reads the data from the main memory,
the cache memory further includes:
  a plurality of priority storage areas corresponding one-to-one to the line storage areas, each being for storing a priority among line storage areas specified by an index included in an address, the address being specified by the processor when the processor reads data from the main memory, and the priority being for causing any of the line storage areas specified by the same index to be ready to newly store data; and priority storage circuitry that, when execution of the second operating system is controlled in a sleep state, and the processor reads data from the main memory by specifying an address, (i) generates a priority for each line storage area specified by an index included in the address in a manner that a priority of a line storage area storing data read by the processor executing the second operating system is lower than a priority of a line storage area storing data read by the processor executing the first operating system, and (ii) stores the priorities thus generated into priority storage areas corresponding to the line storage areas specified by the index included in the address, and the predetermined algorithm is for referring to the priority stored in each of the priority storage areas, and writing back data stored in a line storage area having the highest priority among line storage areas specified by an index included in an address, the address being specified by the processor when the processor reads data from the main memory.

8. The virtual machine system of claim 1, wherein
the plurality of ways include a first way and a second way,
the data storage circuitry stores only data read from the secure storage area into the first way, and stores only data read from a storage area other than the secure storage area into the second way, thereby allowing for the identification of whether data has been read from the secure storage area, and
the predetermined algorithm is for setting the second way as a target way from which data is written back to the main memory, when data in any of the ways needs to be written back to the main memory so as to store the data read from the storage area other than the secure storage area.

9. A control method for controlling a virtual machine system including (i) a processor having a first mode and a second mode, the processor executing a first operating system in the first mode, and the processor executing a second operating system executed in the second mode, (ii) write control circuitry that permits writing of data into a predetermined secure storage area in an external main memory, the writing of data into the secure storage area only being permitted when the processor is in the first mode, and (iii) a cache memory having a plurality of ways for storing data read by the processor from the main memory, the control method comprising:

a data storage step of the cache memory, when the processor has read data from the main memory, storing the data into any of the plurality of ways that is ready to newly store data, in a manner that allows for identification of whether the data has been read from the secure storage area; and a write-back step of (i) identifying whether data has been read from the secure storage area and (ii) writing back data stored in the data storage step to the main memory with use of a predetermined algorithm according to a result of the identification, such that the number of times data stored in each of the ways is intermittently written back to the secure storage area is reduced and the number of times the processor is switched from the second mode to the first mode to perform writing of data to the secure storage area is reduced, wherein the write-back step includes, when the processor executing the second operating system accesses the main memory, writing back, to the secure storage area, data that is identified as having been read from the secure storage area and that is stored in at least one of the ways by (i) causing the processor to switch from the second mode to the first mode and (ii) writing, to the secure storage area, the data that is identified as having been read from the secure storage area and that is stored in at least one of the ways so that the at least one of the ways is ready to newly store data.

10. A non-transitory computer-readable recording medium having stored thereon a control program for causing a virtual machine system to perform control processing for controlling the virtual machine system, the virtual machine system including (i) a processor having a first mode and a second mode, the processor executing a first operating system in the first mode, and the processor executing a second operating system executed in the second mode, (ii) write control circuitry that permits writing of data into a predetermined secure storage area in an external main memory, the writing of data into the secure storage area only being permitted when the processor is in the first mode, and (iii) a cache memory having a plurality of ways for storing data read by the processor from the main memory, the control processing comprising:

a data storage step of the cache memory, when the processor has read data from the main memory, storing the data into any of the plurality of ways that is ready to newly store data, in a manner that allows for identification of whether the data has been read from the secure storage area; and a write-back step of (i) identifying whether data has been read from the secure storage area and (ii) writing back data stored in the data storage step to the main memory with use of a predetermined algorithm according to a result of the identification, such that the number of times data stored in each of the ways is intermittently written back to the secure storage area is reduced and the number of times the processor is switched from the second mode to the first mode to perform writing of data to the secure storage area is reduced, wherein the write-back step includes, when the processor executing the second operating system accesses the main memory, writing back, to the secure storage area, data that is identified as having been read from the secure storage area and that is stored in at least one of the ways by (i) causing the processor to switch from the second mode to the first mode and (ii) writing, to the secure storage area, the data that is identified as having been read from the secure storage area and that is stored in at least one of the ways so that the at least one of the ways is ready to newly store data.

11. An integrated circuit comprising:

a processor having a first mode and a second mode, the processor executing a first operating system in the first mode, and the processor executing a second operating system executed in the second mode;

write control circuitry that permits writing of data into a predetermined secure storage area in an external main memory, the writing of data into the secure storage area only being permitted when the processor is in the first mode; and a cache memory having a plurality of ways for storing data read by the processor from the main memory, wherein
the cache memory includes:
data storage circuitry that, when the processor has read data from the main memory, stores the data into any of the plurality of ways that is ready to newly store data, in a manner that allows for identification of whether the data has been read from the secure storage area; and write-back circuitry that (i) identifies whether data has been read from the secure storage area and (ii) writes back data stored by the data storage circuitry to the main memory with use of a predetermined algorithm according to a result of the identification, such that the number of times data stored in each of the ways is intermittently written back to the secure storage area is reduced and the number of times the processor is switched from the second mode to the first mode to perform writing of data to the secure storage area is reduced, and when the processor executing the second operating system accesses the main memory, the write-back circuitry writes back, to the secure storage area, data that is identified as having been read from the secure storage area and that is stored in at least one of the ways by (i) causing the processor to switch from the second mode to the first mode and (ii) writing, to the secure storage area, the data that is identified as having been read from the secure storage area and that is stored in at least one of the ways so that the at least one of the ways is ready to newly store data.

* * * * *